(12) United States Patent
Kobayashi et al.

(10) Patent No.: US 10,773,549 B2
(45) Date of Patent: Sep. 15, 2020

(54) BEARING DEVICE FOR VEHICLE WHEEL

(71) Applicant: NTN CORPORATION, Osaka-shi, Osaka (JP)

(72) Inventors: Hisanori Kobayashi, Iwata (JP); Xiaole Bao, Iwata (JP); Yuta Nakatsuji, Iwata (JP); Akira Torii, Iwata (JP)

(73) Assignee: NTN CORPORATION, Osaka (JP)

( * ) Notice: Subject to any disclaimer, the term of this patent is extended or adjusted under 35 U.S.C. 154(b) by 38 days.

(21) Appl. No.: 16/332,103

(22) PCT Filed: Sep. 11, 2017

(86) PCT No.: PCT/JP2017/032655
§ 371 (c)(1),
(2) Date: Mar. 11, 2019

(87) PCT Pub. No.: WO2018/047963
PCT Pub. Date: Mar. 15, 2018

(65) Prior Publication Data
US 2019/0299710 A1    Oct. 3, 2019

(30) Foreign Application Priority Data

Sep. 12, 2016 (JP) ................... 2016-178090
Sep. 27, 2016 (JP) ................... 2016-188862

(51) Int. Cl.
*F16C 33/78* (2006.01)
*B60B 27/00* (2006.01)
(Continued)

(52) U.S. Cl.
CPC ...... *B60B 27/0094* (2013.01); *B60B 27/0005* (2013.01); *B60B 27/02* (2013.01);
(Continued)

(58) Field of Classification Search
CPC ............. B60B 27/0005; B60B 27/001; B60B 27/0073; B60B 27/0094; F16C 19/186;
(Continued)

(56) References Cited

U.S. PATENT DOCUMENTS 8,393,795 B2   3/2013   Aritake et al.
9,090,122 B2   7/2015   Morita
(Continued)

FOREIGN PATENT DOCUMENTS

JP   2011-007272   1/2011
JP   2011-116171   6/2011
(Continued)

OTHER PUBLICATIONS

International Search Report dated Dec. 5, 2017 in International (PCT) Application No. PCT/JP2017/032655.

*Primary Examiner* — Phillip A Johnson
(74) *Attorney, Agent, or Firm* — Wenderoth, Lind & Ponack, L.L.P.

(57) ABSTRACT

A bearing device 1 for a vehicle wheel, wherein an annular weir part 20 is provided on the outer periphery of an outer-side end part of an outer member 2, the annular weir part 20 having the rotation axis L of an inner member 3 as a center, the weir part 20 having a shape that is asymmetrical between the upper side Us and the lower side Ls of the outer member 2, and the weir part 20 being inclined farther toward the inner side the more a weir wall surface 20*a* faces outward in the radial direction in a part or all of the upper side Us. Also, the weir part 20 is inclined farther toward the outer side the more the weir wall surface 20*a* faces outward in the radial direction in a part or all of the lower side Ls.

8 Claims, 25 Drawing Sheets

(51) Int. Cl.
*B60B 27/02* (2006.01)
*B60B 35/02* (2006.01)
*F16C 19/18* (2006.01)
*F16J 15/3232* (2016.01)
*F16C 33/80* (2006.01)
*B60B 35/16* (2006.01)

(52) U.S. Cl.
CPC ............ *B60B 35/02* (2013.01); *B60B 35/025* (2013.01); *F16C 19/186* (2013.01); *F16C 33/7876* (2013.01); *F16C 33/805* (2013.01); *F16J 15/3232* (2013.01); *B60B 35/16* (2013.01); *B60B 2380/12* (2013.01); *B60B 2380/75* (2013.01); *F16C 2326/02* (2013.01)

(58) Field of Classification Search
CPC ............... F16C 19/386; F16C 33/7876; F16C 33/7879; F16C 33/7886; F16C 33/805; F16C 2326/02
See application file for complete search history.

(56) References Cited

U.S. PATENT DOCUMENTS

| | | | |
|---|---|---|---|
| 9,662,937 B2 * | 5/2017 | Duch | B60B 27/0005 |
| 9,855,793 B2 | 1/2018 | Lim et al. | |
| 2007/0076994 A1 * | 4/2007 | Norimatsu | F16C 33/7896 384/486 |
| 2007/0278748 A1 * | 12/2007 | Matsui | F16C 33/7876 277/549 |
| 2008/0199120 A1 * | 8/2008 | Torii | F16C 33/805 384/480 |
| 2010/0109424 A1 * | 5/2010 | Inoue | F16C 19/386 301/109 |
| 2011/0182538 A1 * | 7/2011 | Langer | B60B 27/0094 384/484 |
| 2012/0177312 A1 | 7/2012 | Aritake et al. | |
| 2012/0177315 A1 | 7/2012 | Matsuki et al. | |
| 2013/0241270 A1 | 9/2013 | Morita | |
| 2016/0003302 A1 * | 1/2016 | Seno | F16C 33/805 277/351 |
| 2016/0221391 A1 | 8/2016 | Lim et al. | |
| 2018/0186181 A1 * | 7/2018 | Tada | F16J 15/3264 |

FOREIGN PATENT DOCUMENTS

| | | | | |
|---|---|---|---|---|
| JP | 2011117529 A | * | 6/2011 | ......... F16C 33/7876 |
| JP | 2012-097817 | | 5/2012 | |
| JP | 2012154374 A | * | 8/2012 | ............ F16C 33/805 |
| JP | 2013-052770 | | 3/2013 | |
| JP | 2013-194908 | | 9/2013 | |
| JP | 2014-219100 | | 11/2014 | |

* cited by examiner

… (1 / 2) …

BEARING DEVICE FOR VEHICLE WHEEL

TECHNICAL FIELD

The present invention relates to a bearing device for a vehicle wheel.

BACKGROUND ART

For use in a suspension system of an automobile, a bearing device for a vehicle wheel which rotatably supports the vehicle wheel has been known. In the bearing device for a vehicle wheel, an outer member is fixed to a knuckle constituting the suspension system. In the bearing device for a vehicle wheel, an inner member is disposed on an inner side of the outer member, and rolling elements are interposed between the outer member and the inner member. In this manner, the bearing device for a vehicle wheel constitutes a rolling bearing that allows the vehicle wheel attached to the inner member to freely rotate.

In such a bearing device for a vehicle wheel, when muddy water or dust enters into an annular space formed between the outer member and the inner member, the rolling elements and the like are damaged to decrease the life of the bearing. Also, when grease filled in the annular space leaks, the rolling elements and the like are damaged to decrease the life of the bearing. For this reason, to prevent the entrance of muddy water and dust as well as the leakage of grease, the bearing device for a vehicle wheel includes a seal member for sealing the annular space. This is disclosed in, for example, Patent Literature 1, Patent Literature 2, and Patent Literature 3.

A bearing device for a vehicle wheel described in Patent Literature 1 includes an outer member, an inner member, rolling elements interposed between the outer member and the inner member, and a seal member for sealing an outer-side end of an annular space formed between the outer member and the inner member. However, when muddy water flows along the outer member and reaches the seal member, the bearing device for a vehicle wheel may catch foreign matters contained in muddy water, resulting in that the seal member is broken or worn. That is, the sealing performance of the seal member may lower.

Thus, in a bearing device for a vehicle wheel described in Patent Literature 2, to prevent muddy water from flowing along an outer member to reach a seal member, the configuration of the seal member is designed to provide a weir portion on the outer circumference on the outer member. In a bearing device for a vehicle wheel described in Patent Literature 3, a separate component is fitted to an outer member to form a weir portion on the outer circumference of the outer member. However, in these bearing devices for a vehicle wheel, when muddy water hits against the weir wall face of the weir portion and scatters, the scattered muddy water may splash over the weir portion and reach the seal member (see arrows F in FIGS. 24A and 24B), failing to eliminate the concern that the seal member is broken or worn. That is, disadvantageously, the concern that the sealing performance of the seal member lowers cannot be eliminated.

Further, in the bearing device for a vehicle wheel described in Patent Literature 2, a core metal of the seal member extends along the outer-side end face of the outer member in the radial outward direction, and a seal rubber encloses the outer edge of the core metal to constitute the weir portion on the outer circumference of the outer member. However, in such a bearing device for a vehicle wheel, hub bolts are press-fitted to a vehicle wheel-attaching flange and heads of the hub bolts are in proximity of the outer member. Thus, when the height of the weir portion is increased, the hub bolt cannot be disadvantageously exchanged (see FIG. 25).

Against this backdrop, a bearing device for a vehicle wheel provided with guide grooves for passing the respective hub bolts therethrough on the outer circumference of the weir portion has been proposed. In such a bearing device for a vehicle wheel, due to the guide grooves, the diameter of the core metal cannot be made large and thus, does not protrude so much from at least the outer circumference of the outer member. However, there is a demand for increasing the stiffness of the core metal to suppress a distortion of the fitting portion and increasing the force to fit the core metal to the outer member. That is, there is a demand for increasing the stiffness of the core metal to suppress a distortion of the fitting portion and increase the force to fit the core metal to the outer member, thereby preventing the seal member from being detached and water from entering into the fitting portion between the seal member and the outer member.

CITATIONS LIST

Patent Literatures

Patent Literature 1: JP-A 2014-219100 Gazette
Patent Literature 2: JP-A 2012-97817 Gazette
Patent Literature 3: JP-A 2011-7272 Gazette

SUMMARY OF INVENTION

Technical Problems

An object of the present invention is to provide a bearing device for a vehicle wheel capable of eliminating the concern that the sealing performance of the seal member lowers, thereby preventing a damage of the rolling elements and the like to increase the life of the bearing. Another object is to provide a bearing device for a vehicle wheel provided with the weir portion, which is an element of the present invention, constituting no obstacle at exchange of the hub bolt. Still another object is to provide a bearing device for a vehicle wheel capable of increasing a force to fit the core metal to the outer member, thereby preventing the seal member from being detached and water from entering into the fitting portion between the seal member and the outer member.

Solutions to Problems

A bearing device for a vehicle wheel according to a first aspect includes: an outer member having double-row outer rolling faces on an inner circumference of the outer member; an inner member including a hub wheel having a vehicle wheel-attaching flange into which a plurality of hub bolts are press-fitted and an axially-extending narrowed stepped portion, and at least one inner wheel press-fitted to the narrowed stepped portion of the hub wheel, the inner member having double-row inner rolling faces opposed to the double-row outer rolling faces on an outer circumference of the inner member; double-row rolling elements rollably interposed between the rolling faces of the outer member and the rolling faces of the inner member; and a seal member for sealing an outer-side end of an annular space formed between the outer member and the inner member, wherein a ring-like weir portion about a rotation axis of the inner member is provided on an outer circumference of an outer-side end of the outer member, and the weir portion is asymmetrical in an upper half and a lower half of the outer member, and a weir wall face in a part or whole of the upper half is inclined toward an inner side in a radial outward direction.

According to a second aspect, in the bearing device for a vehicle wheel according to the first aspect, the weir wall face of the weir portion in a part or whole of the lower half is inclined toward an outer side in the radial outward direction.

According to a third aspect, in the bearing device for a vehicle wheel according to the first or second aspect, the weir portion has a folded portion extending toward the inner side on an outer edge of the weir portion.

According to a fourth aspect, in the bearing device for a vehicle wheel according to any one of the first to third aspects, the weir portion has guide grooves for passing the respective hub bolts therethrough on an outer edge of the weir portion.

According to a fifth aspect, in the bearing device for a vehicle wheel according to the fourth aspect, the plurality of hub bolts are circumferentially disposed at regular intervals on a concentric circle about the rotation axis, and the guide grooves are circumferentially disposed at regular intervals on the concentric circle, the number of the guide grooves being same as the number of the hub bolts or being a multiple of the number of the hub bolts.

A bearing device for a vehicle wheel according to a sixth aspect includes: an outer member having double-row outer rolling faces on an inner circumference of the outer member; an inner member including a hub wheel having a vehicle wheel-attaching flange into which a plurality of hub bolts are press-fitted and an axially-extending narrowed stepped portion, and at least one inner wheel press-fitted to the narrowed stepped portion of the hub wheel, the inner member having double-row inner rolling faces opposed to the double-row outer rolling faces on an outer circumference of the inner member; double-row rolling elements rollably interposed between the rolling faces of the outer member and the rolling faces of the inner member; and a seal member for sealing an outer-side end of an annular space formed between the outer member and the inner member, wherein the seal member is configured such that a seal rubber is integrally bonded to a core metal by vulcanization, and has a weir portion fitted to an outer circumference of the outer member, the weir portion has a folded portion formed by bending the core metal toward an axial inner side, the core metal extending along an outer-side end face of the outer member further than the outer member in a radial outward direction, the weir portion is configured such that seal rubber is integrally bonded to the folded portion by vulcanization, and guide grooves for passing the respective hub bolts therethrough are formed on an outer circumference of the seal rubber constituting the weir portion.

According to a seventh aspect, in the bearing device for a vehicle wheel according to the sixth aspect, when the bearing device is attached to a vehicle body, given a vertical line that intersects with a rotation axis of the inner member and is parallel to a gravity-acting direction and a horizontal line that intersects with the rotation axis and is perpendicular to the vertical line, the guide grooves are formed to intersect with or to be located in the vicinity of the horizontal line.

According to an eighth aspect, in the bearing device for a vehicle wheel according to the sixth or seventh aspect, the plurality of hub bolts are circumferentially disposed at regular intervals on a concentric circle about a rotation axis of the inner member, and the guide grooves are circumferentially disposed at regular intervals on the concentric circle, the number of the guide grooves being same as the number of the hub bolts or being a multiple of the number of the hub bolts.

Advantageous Effects of Invention

The bearing device for a vehicle wheel according to the present invention is provided with the ring-like weir portion about the rotation axis of the inner member on the outer circumference of the outer-side end of the outer member. The weir portion is asymmetrical in the upper half and the lower half of the outer member, and the inner weir wall face in a part or whole of the upper half is inclined toward the inner side in the radial outward direction. Thus, in the bearing device for a vehicle wheel, even when muddy water hits against the weir wall face of the weir portion and scatters, the scattered muddy water does not splash over the weir portion, preventing muddy water from reaching the seal member. Therefore, the concern that the sealing performance of the seal member lowers can be eliminated, and a damage of the rolling elements and the like can be prevented to increase the life of the bearing.

In the bearing device for a vehicle wheel according to the present invention, the weir wall face of the weir portion in a part or whole of the lower half is inclined toward an outer side in the radial outward direction. In this manner, in the bearing device for a vehicle wheel, muddy water flowing along the outer circumference of the outer member flows along the inclined weir wall face smoothly and continuously, and does not whirl up due to traveling wind. Thereby, muddy water can be prevented from reaching the seal member.

In the bearing device for a vehicle wheel according to the present invention, the weir portion has a folded portion extending toward the inner side on an outer edge. In this manner, in the bearing device for a vehicle wheel, all of muddy water scatters to the inner side and the lower side, and never reaches the seal member. Muddy water does not flow around the outer edge of the weir wall face and thus, the bearing device for a vehicle wheel can prevent muddy water from reaching the seal member.

In the bearing device for a vehicle wheel according to the present invention, the weir portion has guide grooves for passing the respective hub bolts therethrough on the outer edge. Therefore, the bearing device for a vehicle wheel can exchange the hub bolt without disassembling the outer member and the inner member.

In the bearing device for a vehicle wheel according to the present invention, a plurality of hub bolt are circumferentially disposed at regular intervals on a concentric circle about a rotation axis. The guide grooves are circumferentially disposed at regular intervals on the concentric circle, the number of the guide grooves being same as the number of the hub bolts or being a multiple of the number of the hub bolts. Thereby, in the bearing device for a vehicle wheel, all of the hub bolts can be aligned with all of the guide grooves, facilitating the operation of exchanging the hub bolt.

In the bearing device for a vehicle wheel according to the present invention, the seal member is configured such that the seal rubber is integrally bonded to the core metal by vulcanization, and has the weir portion fitted to the outer circumference of the outer member. The weir portion has the folded portion formed by bending the core metal to the axial inner side, the core metal extending along the outer-side end face of the outer member in the radial outward direction further than the outer member. The seal rubber is integrally bonded to the folded portion by vulcanization. The guide grooves for passing the respective hub bolts therethrough are formed on the outer circumference of the seal rubber. The bearing device for a vehicle wheel can increase the stiffness of the core metal to suppress a distortion of the fitting portion. Therefore, the force to fit the core metal to the outer member can be increased, thereby preventing the seal member from being detached, and water from entering into the fitting portion between the seal member and the outer member.

In the bearing device for a vehicle wheel according to the present invention, when attached to a vehicle body, given a vertical line that intersects with a rotation axis of the inner member and is parallel to a gravity-acting direction and a horizontal line that intersects with the rotation axis and is perpendicular to the vertical line, the guide grooves are formed to intersect with or to be located in the vicinity of the horizontal line. The bearing device for a vehicle wheel can prevent muddy water from passing through the guide groove to reach the seal member. Therefore, the concern that the sealing performance of the seal member lowers can be eliminated, and a damage of the rolling element and the like can be prevented to increase the life of the bearing.

In the bearing device for a vehicle wheel according to the present invention, the plurality of hub bolts are circumferentially disposed at regular intervals on the concentric circle about the rotation axis of the inner member. The guide grooves are circumferentially disposed at regular intervals on the concentric circle, the number of the guide grooves being same as the number of the hub bolts or being a multiple of the number of the hub bolts. In such a bearing device for a vehicle wheel, all of the hub bolts can be aligned with all of the guide grooves, facilitating the operation of exchanging the hub bolt.

DESCRIPTION OF EMBODIMENTS

Figure 1:
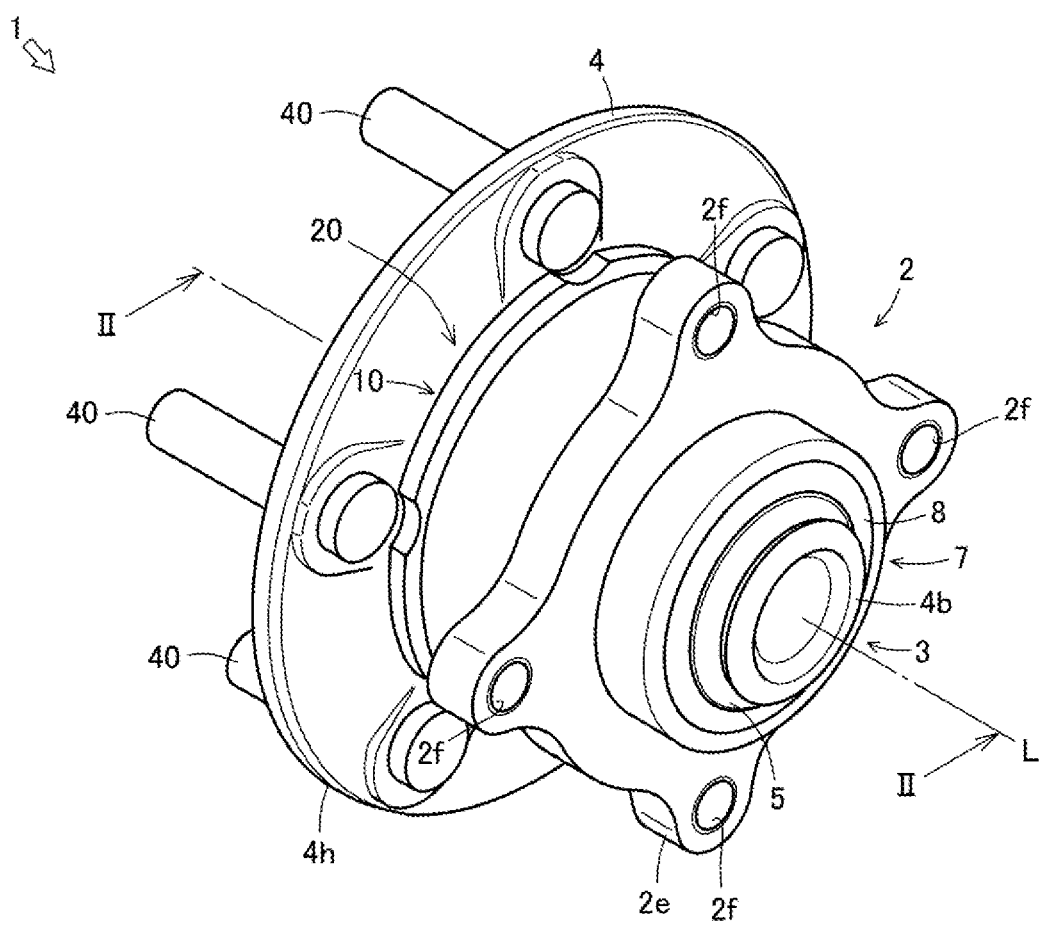
FIG. 1 is a perspective view illustrating an entire configuration of a bearing device for a vehicle wheel.
Figure 2:
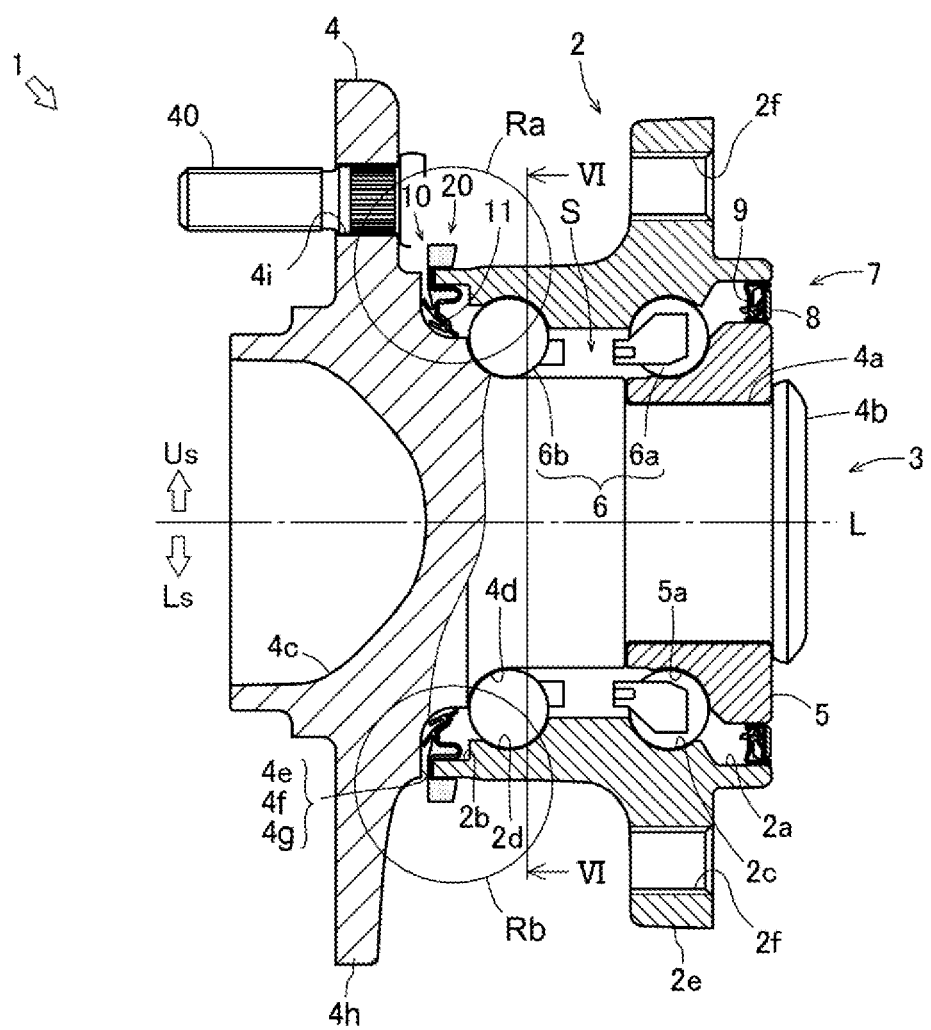
FIG. 2 is a sectional view illustrating the entire configuration of the bearing device for a vehicle wheel.
Figure 3:
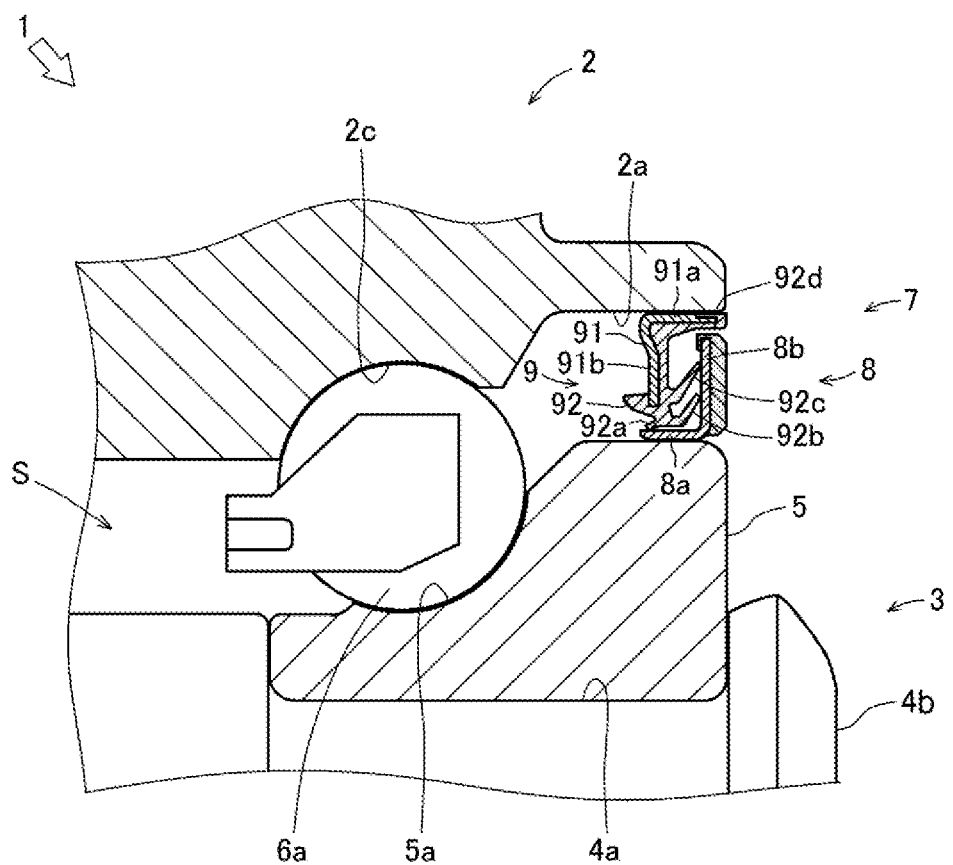
FIG. 3 is a sectional view illustrating a partial configuration of the bearing device for a vehicle wheel.
Figure 4:
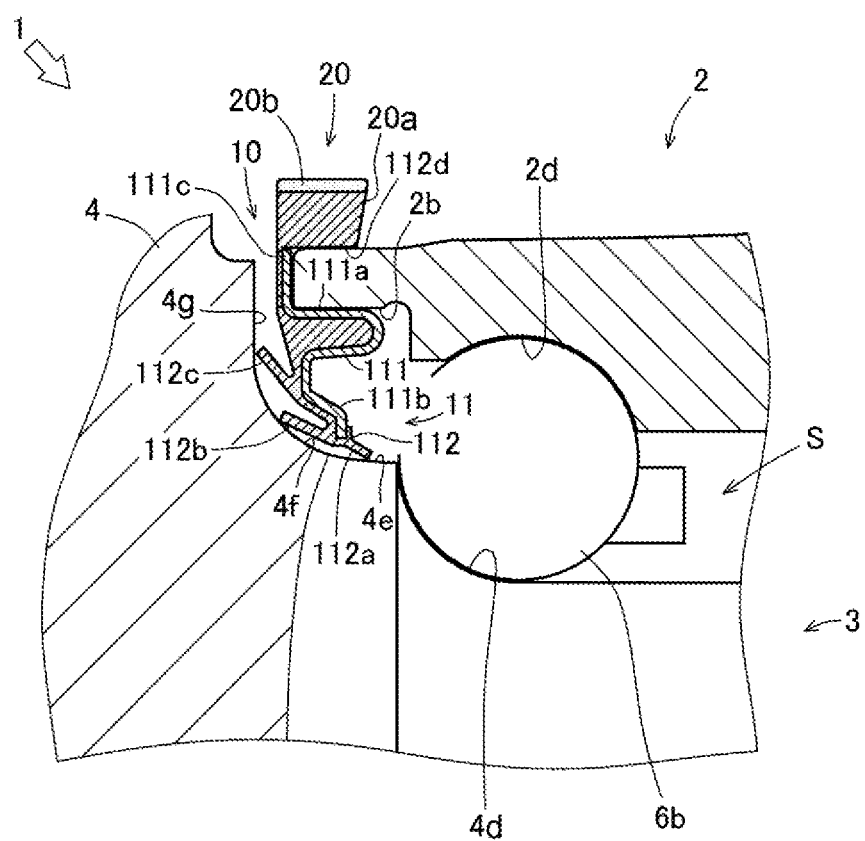
FIG. 4 is a sectional view illustrating a partial configuration of the bearing device for a vehicle wheel.

A bearing device 1 for a vehicle wheel according to the present invention will be described below with reference to FIG. 1 to FIG. 4. FIG. 1 is a perspective view of the bearing device 1 for a vehicle wheel. FIG. 2 is a sectional view taken along II-II in FIG. 1. FIG. 3 and FIG. 4 are enlarged views of partial regions in FIG. 2.

The bearing device 1 for a vehicle wheel rotatably supports a vehicle wheel in a suspension system of an automobile or the like. The bearing device 1 for a vehicle wheel includes an outer member 2, an inner member 3 (a hub wheel 4 and an inner wheel 5), rolling elements 6, a seal member 7 (hereinafter referred to as "inner-side seal member 7"), and a seal member 10 (hereinafter referred to as "outer-side seal member 10"). Here, the inner-side refers to the vehicle body-side of the bearing device 1 for a vehicle wheel attached to the vehicle body, and the outer-side refers to the vehicle wheel-side of the bearing device 1 for a vehicle wheel attached to the vehicle body.

The outer member 2 constitutes an outer wheel of a rolling bearing. The outer member 2 is made of medium-high carbon steel containing 0.40 to 0.80 wt % of carbon such as S53C. An expanded portion 2a is formed at an inner-side end of the outer member 2. An expanded portion 2b is formed at an outer-side end of the outer member 2. Further, an annular outer rolling face 2c and an annular outer rolling face 2d are formed between the expanded portion 2a and the expanded portion 2b so as to be parallel to each other. The outer rolling face 2c and the outer rolling face 2d are subjected to induction quenching to be hardened so as to have a surface hardness in the range of 58 to 64 HRC. A knuckle-attaching flange 2e is integrally formed on the outer circumference of the outer member 2. The knuckle-attaching flange 2e has bolt holes 2f circumferentially disposed at regular intervals on a concentric circle about a rotation axis L of the inner member 3 (the hub wheel 4 and the inner wheel 5).

The inner member 3 constitutes an inner wheel of the rolling bearing. The inner member 3 is configured of the hub wheel 4 and the inner wheel 5.

The hub wheel 4 is made of medium-high carbon steel containing 0.40 to 0.80 wt % of carbon such as S53C. A narrowed stepped portion 4a is formed at an inner-side end of the hub wheel 4. An end of the narrowed stepped portion 4a is bent in the radial outward direction to form a swaging portion 4b for fixing the inner wheel 5. An opening 4c is formed at the outer-side end of the hub wheel 4. Further, an annular inner rolling face 4d is formed on the outer circumference of the hub wheel 4. The inner rolling face 4d is opposed to the outer rolling face 2d of the outer member 2. The hub wheel 4 is subjected to induction quenching from the narrowed stepped portion 4a to a seal land portion (consisting of below-mentioned axial face portion 4e, curved face portion 4f, and side face portion 4g) through the inner rolling face 4d to be hardened so as to have a surface hardness in the range of 58 to 64 HRC. A vehicle wheel-attaching flange 4h is integrally formed on the outer circumference of the hub wheel 4. The vehicle wheel-attaching flange 4h has bolt holes 4i circumferentially disposed at regular intervals on the concentric circle about the rotation axis L of the inner member 3 (the hub wheel 4 and the inner wheel 5), and hub bolts 40 are press-fitted into the respective bolt holes 4i.

The inner wheel 5 is made of high-carbon chromium bearing steel such as SUJ2. An annular inner rolling face 5a is formed on the outer circumference of the inner wheel 5. That is, inner wheel 5 is fitted to the narrowed stepped portion 4a of the hub wheel 4 to constitute the inner rolling face 5a on the outer circumference of the narrowed stepped portion 4a. The inner rolling face 5a is opposed to the outer rolling face 2c of the outer member 2. The inner wheel 5 is subjected to so-called immersion quenching up to its core to be hardened so as to have a hardness in the range of 58 to 64 HRC.

The rolling elements 6 constitute rolling portions of the rolling bearing. The rolling elements 6 are made of high-carbon chromium bearing steel such as SUJ2. A ball row 6a on the inner side is configured by annually disposing the plurality of rolling elements 6 in a holder. The ball row 6a is rollably accommodated between the inner rolling face 5a on the inner wheel 5 and the opposed outer rolling face 2c of the outer member 2. Meanwhile, a ball row 6b on the outer side is also configured by annually disposing the plurality of rolling elements 6 in a holder. The ball row 6b is rollably accommodated between the inner rolling face 4d on the hub wheel 4 and the opposed outer rolling face 2d of the outer member 2. Each of the rolling elements 6 constituting the ball row 6a and the ball row 6b is subjected to so-called immersion quenching up to its core to be hardened so as to have a hardness in the range of 58 to 64 HRC.

The inner-side seal member 7 seals the inner-side end of an annular space S formed between the outer member 2 and the inner member 3. As illustrated in FIG. 3, the inner-side seal member 7 is configured of a ring-like slinger 8 and a ring-like seal ring 9.

The slinger 8 is fitted (externally fitted) to the outer circumference of the inner wheel 5.

The slinger 8 is formed of a ferritic stainless steel plate (such as SUS430 according to the JIS Standard), an austenite stainless steel plate (such as SUS304 according to the JIS Standard), or a rustproof cold-rolled steel plate (such as SPCC according to the JIS Standard). The slinger 8 is formed by bending an annularly-cut steel plate by pressing, and has an axial cross section bent at right angles. Thus, the slinger 8 has a tubular fitting portion 8a and a disc-like side plate portion 8b extending from an end of the fitting portion 8a toward the outer member 2. The fitting portion 8a and the side plate portion 8b intersect each other at right angles, and the fitting portion 8a is fitted along the outer circumferential face of the inner wheel 5. The side plate portion 8b extends toward the outer member 2, and is opposed to a side plate portion 91b of a below-mentioned core metal 91.

The seal ring 9 is fitted (internally fitted) to the expanded portion 2a of the outer member 2. The seal ring 9 is configured of the core metal 91 and the seal rubber 92.

The core metal 91 is formed of a ferritic stainless steel plate (such as SUS430 according to the JIS Standard), an austenite stainless steel plate (such as SUS304 according to the JIS Standard), or a rustproof cold-rolled steel plate (such as SPCC according to the JIS Standard). The core metal 91 is formed by bending an annularly-cut steel plate by pressing, and has an axial cross section bent at right angles. Thus, the core metal 91 has a tubular fitting portion 91a and the disc-like side plate portion 91b extending from an end of the fitting portion 91a toward the inner member 3 (the inner wheel 5). The fitting portion 91a and the side plate portion 91b cross each other at substantially right angles, and the fitting portion 91a is fitted along the inner circumferential face of the expanded portion 2a. The side plate portion 91b extends toward the inner member 3 (the inner wheel 5), and is opposed to the side plate portion 8b of the slinger 8. An elastic seal rubber 92 is bonded to the fitting portion 91a and the side plate portion 91b by vulcanization.

The seal rubber 92 is made of synthetic rubber, for example, NBR (acrylonitrile-butadiene rubber), HNBR (hydrogenated acrylonitrile-butadiene rubber) and EPDM (ethylene propylene rubber) which are excellent in heat resistance, ACM (polyacrylic rubber) and FKM (fluororubber) which are excellent in heat resistance and chemical resistance, or silicon rubber. The seal rubber 92 has a radial lip 92a, an inner axial lip 92b, and an outer axial lip 92c, which are seal lips. The seal rubber 92 has an edge seal portion 92d formed around the fitting portion 91a of the core metal 91.

In this manner, in the inner-side seal member 7, the slinger 8 is opposed to the seal ring 9. At this time, the radial lip 92a is in contact with the fitting portion 8a of the slinger 8 via an oil film. The inner axial lip 92b is in contact with the side plate portion 8b of the slinger 8 via the oil film. The outer axial lip 92c is also in contact with the side plate portion 8b of the slinger 8 via the oil film. In this manner, the inner-side seal member 7 prevents the entrance of muddy water and dust and the leakage of grease. Note that the edge seal portion 92d serves to prevent water from entering into a fitting portion between the outer member 2 and the core metal 91 (a contact portion between the outer member 2 and the core metal 91), causing corrosion.

The outer-side seal member 10 seals the outer-side end of the annular space S formed between the outer member 2 and the inner member 3. As illustrated in FIG. 4, the outer-side seal member 10 is formed of a ring-like seal ring 11.

The seal ring 11 is fitted (internally fitted) to the expanded portion 2b of the outer member 2. The seal ring 11 consists of a core metal 111 and a seal rubber 112.

The core metal 111 is formed of a ferritic stainless steel plate (such as SUS430 according to the JIS Standard), an austenite stainless steel plate (such as SUS304 according to the JIS Standard), or a rustproof cold-rolled steel plate (such as SPCC according to the JIS Standard). The core metal 111 is formed by bending an annularly-cut steel plate by pressing, and has an axial cross section bent into a complicated shape. Thus, the core metal 111 has a tubular fitting portion 111a, a disc-like side plate portion 111b extending from one end of the fitting portion 111a toward the inner member 3 (the hub wheel 4), and a disc-like stop plate portion 111c extending from the other end of the fitting portion 111a along the outer-side end face of the outer member 2. The fitting portion 111a and the side plate portion 111b intersect each other while being curved, and the fitting portion 111a is fitted along the inner circumferential face of the expanded portion 2b. The side plate portion 111b extends toward the inner member 3 (the hub wheel 4), and is opposed to the curved face portion 4f and the side face portion 4g of the hub wheel 4. Further, the stop plate portion 111c extends toward the outer-side end face of the outer member 2, and is opposed to the side face portion 4g of the hub wheel 4. The elastic seal rubber 112 is bonded to the fitting portion 111a, the side plate portion 111b, and the stop plate portion 111c by vulcanization.

The seal rubber 112 is made of synthetic rubber, for example, NBR (acrylonitrile-butadiene rubber), HNBR (hydrogenated acrylonitrile-butadiene rubber) and EPDM (ethylene propylene rubber) which are excellent in heat resistance, ACM (polyacrylic rubber) and FKM (fluororubber) which are excellent in heat resistance and chemical resistance, or silicon rubber. The seal rubber 112 has a radial lip 112a, an inner axial lip 112b, and an outer axial lip 112c, which are seal lips. The seal rubber 112 has an outer circumferential seal portion 112d that is in contact with the outer circumference of the outer member 2.

In this manner, in the outer-side seal member 10, the seal ring 11 is opposed to the hub wheel 4. At this time, the radial lip 112a is in contact with the axial face portion 4e of the hub wheel 4 via an oil film. The axial lip 112b is in contact with the curved face portion 4f of the hub wheel 4 via the oil film. The outer axial lip 112c is also in contact with the side face portion 4g of the hub wheel 4 via the oil film. In this manner, the outer-side seal member 10 prevents the entrance of muddy water and dust and the leakage of grease. Note that the outer circumferential seal portion 112d serves to prevent water from entering into a fitting portion between the outer member 2 and the core metal 111 (a contact portion between the outer member 2 and the core metal 111), causing corrosion.

Figure 5A:
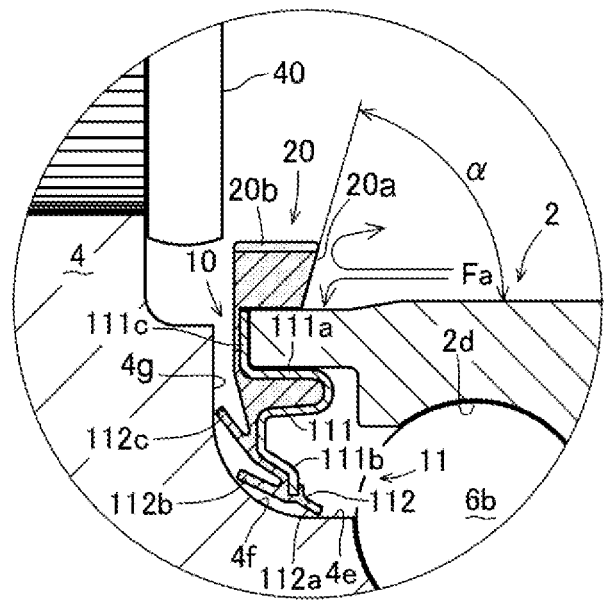
FIGS. 5A and 5B are axial sectional views illustrating a weir portion according to a first embodiment.
Figure 5B:
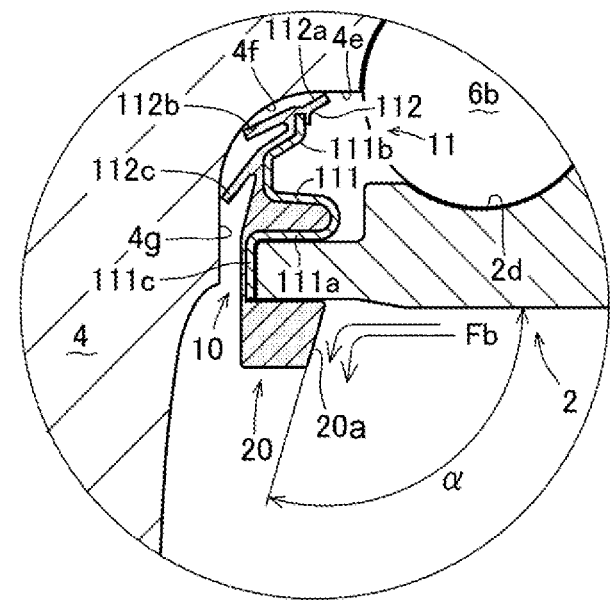
Figure 6:
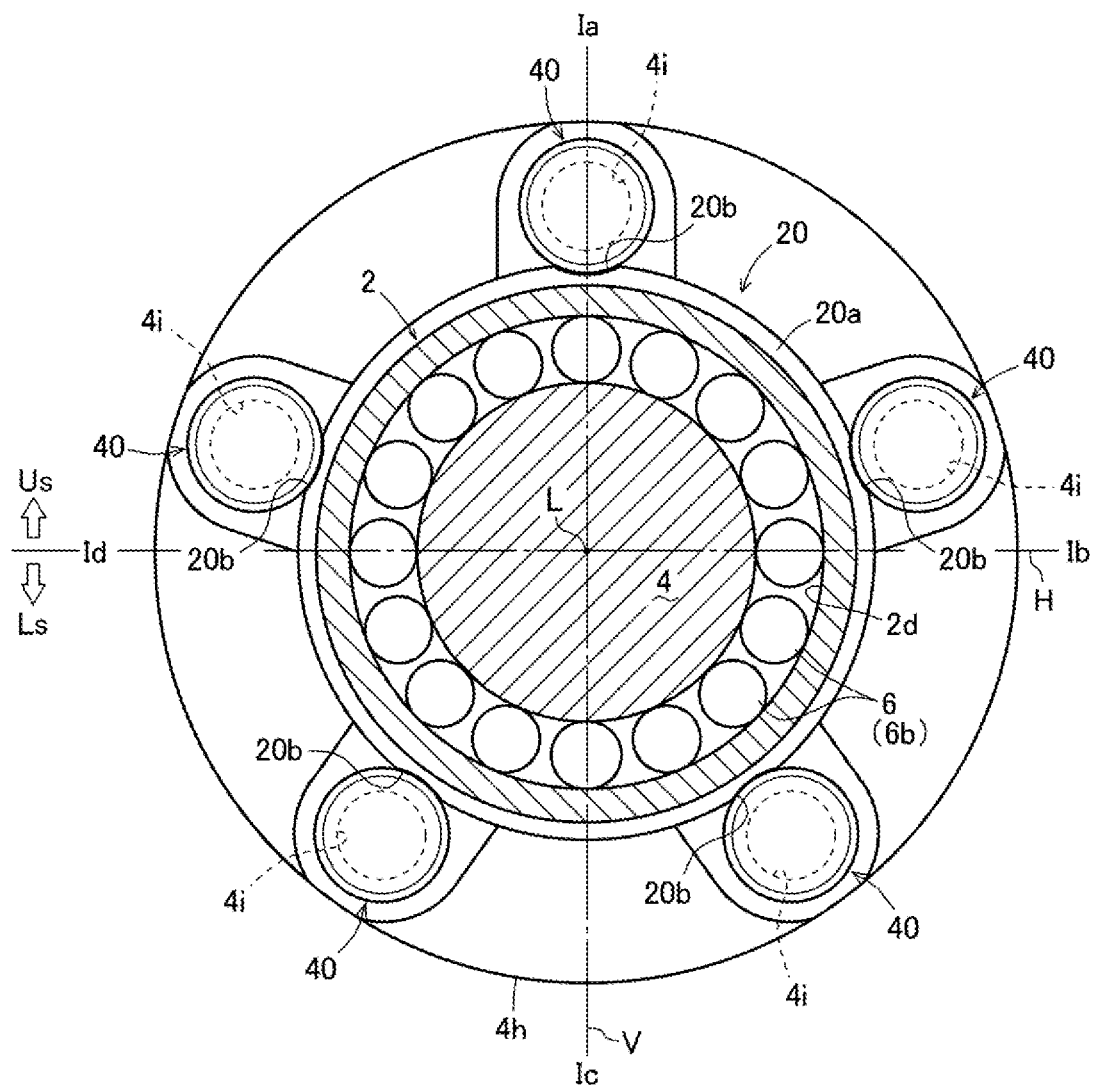
FIG. 6 is a radial sectional view illustrating a bearing device for a vehicle wheel provided with the weir portion according to the first embodiment.
Figure 7:
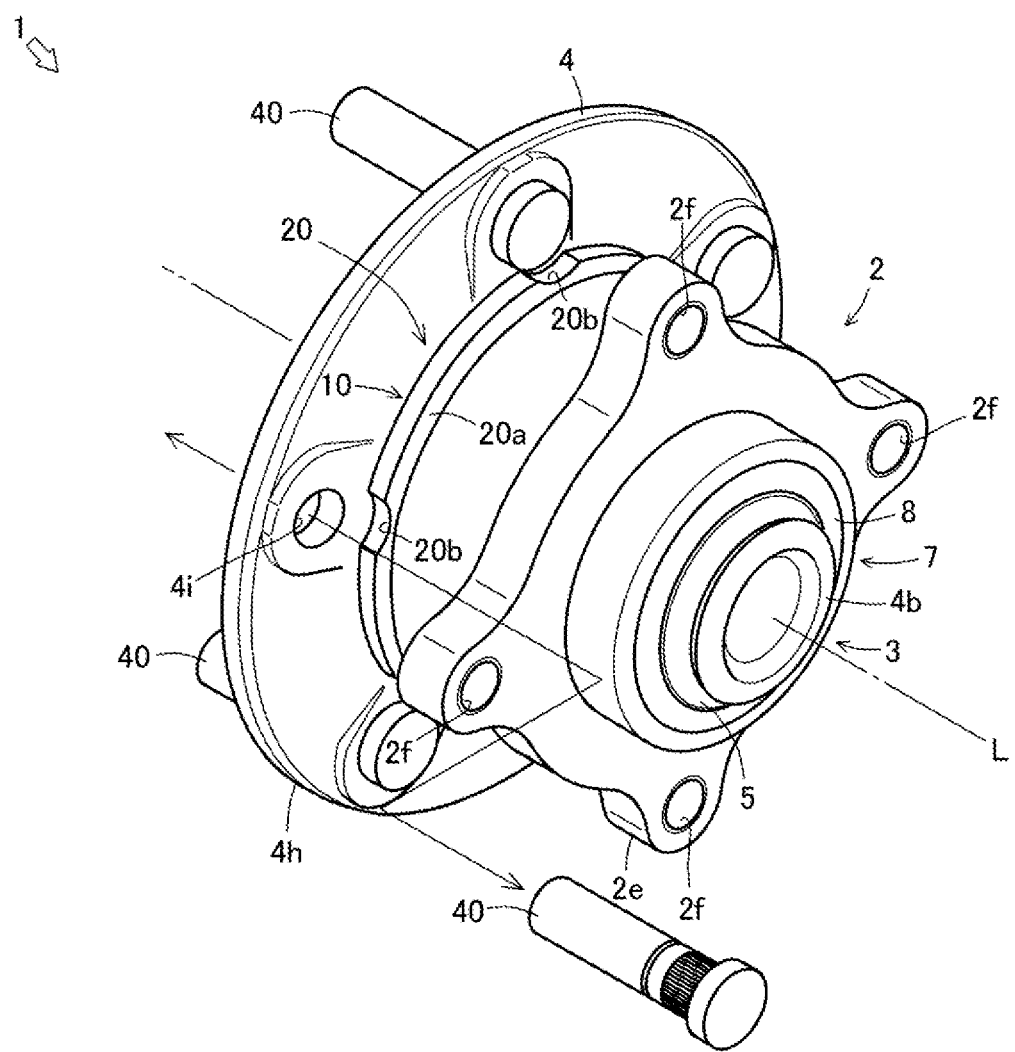
FIG. 7 is a view illustrating an operation of exchanging a hub bolt.

Next, with reference to FIG. 5 to FIG. 7, a weir portion 20 according to a first embodiment will be described in detail. FIG. 5A is an enlarged view of a region Ra in FIG. 2, and FIG. 5B is an enlarged view of a region Rb in FIG. 2. FIG. 6 is a view illustrating a cross section taken along VI-VI in FIG. 2. FIG. 7 illustrates an operation of exchanging the hub bolt 40.

The outer-side seal member 10 constitutes the weir portion 20 on the outer circumference of the outer member 2. The weir portion 20 is configured of a part of the seal rubber 112. The weir portion 20 is made of synthetic rubber, for example, NBR (acrylonitrile-butadiene rubber), HNBR (hydrogenated acrylonitrile-butadiene rubber) and EPDM (ethylene propylene rubber) which are excellent in heat resistance, ACM (polyacrylic rubber) and FKM (fluororubber) which are excellent in heat resistance and chemical resistance, or silicon rubber. The weir portion 20 is shaped like a ring about the rotation axis L of the inner member 3 (the hub wheel 4 and the inner wheel 5) (see FIG. 2). However, the weir portion 20 is not limited to a complete ring, and may lack a part of its circumference. Here, as illustrated in FIG. 6, when attached to the vehicle, given a vertical line V that intersects with the rotation axis L of the inner member 3 (the hub wheel 4 and the inner wheel 5) and is parallel to a gravity-acting direction and a horizontal line H that intersects with the rotation axis L of the inner member 3 (the hub wheel 4 and the inner wheel 5) and is perpendicular to the vertical line V, an upper half Us of the outer member 2 refers to the side above the horizontal line H, and a lower half Ls of the outer member 2 refers to the side below the horizontal line H. The radial outward direction is the direction of moving outward from the rotation axis L of the inner member 3 (the hub wheel 4 and the inner wheel 5).

The weir portion 20 according to this embodiment has a substantially trapezoidal axial cross section. The weir portion 20 is asymmetrical in the upper half Us and the lower half Ls of the outer member 2 (see FIG. 5). In the upper half Us of the outer member 2, the inner weir wall face 20a of the weir portion 20 is inclined toward the inner side in the radial outward direction. In the lower half Ls of the outer member 2, the inner weir wall face 20a of the weir portion 20 is inclined toward the outer side in the radial outward direction. Specifically, given that an imaginary line Ia extending upward from the rotation axis L has an phase angle of 0 degrees, an imaginary line Ib extending forward from the rotation axis L has a phase angle of 90 degrees, an imaginary line Ic extending downward from the rotation axis L has a phase angle of 180 degrees, and an imaginary line Id extending rearward from the rotation axis L has a phase angle of 270 degrees, in the axial cross section having the phase angle of 0 degrees, the inner weir wall face 20a is inclined the most toward the inner side in the radial outward direction. In the axial cross section having a phase angle of 180 degrees, the inner weir wall face 20a is inclined the most toward the outer side in the radial outward direction. In the axial cross section at the phase angle of 90 degrees and the phase angle of 270 degrees, the inner weir wall face 20a is not inclined but is perpendicular to the rotation axis L. Note that, in the weir portion 20, an inclination angle $\alpha$ of the weir wall face 20a smoothly changes at a certain rate with a change in the phase angle.

The reason why the weir wall face 20a in the upper half Us of the outer member 2 is inclined toward the inner side is that muddy water hitting against the weir wall face 20a is allowed to scatter toward the inner side or the lower side (see arrows Fa in FIG. 5A). This has the effect of preventing the scattered muddy water from splashing over weir portion 20 to reach the outer-side seal member 10.

As described above, the weir portion 20 according to this embodiment is asymmetrical in the upper half Us and the lower half Ls of the outer member 2, and the inner weir wall face 20a in a part or whole of the upper half Us is inclined toward the inner side in the radial outward direction. As a result, in the bearing device 1 for a vehicle wheel, even when muddy water hits against the weir wall face 20a of the weir portion 20 and scatters, the scattered muddy water do not splash over the weir portion 20, preventing muddy water from reaching the seal member (the outer-side seal member 10). Therefore, the concern that the sealing performance (or durability) of the seal member (the outer-side seal member 10) lowers can be eliminated, and a damage of the rolling elements and the like can be prevented to increase the life of the bearing.

The reason why the inner weir wall face 20a in the lower half Ls of the outer member 2 is inclined toward the outer side in the radial outward direction is that muddy water flowing along the outer circumference of the outer member 2 is not allowed to disperse due to traveling wind, but flows down together (see arrows Fb in FIG. 5B). This achieves the effect of preventing muddy water from whirling up due to traveling wind to reach the outer-side seal member 10.

As described above, the weir portion 20 according to this embodiment is asymmetrical in the upper half Us and the lower half Ls of the outer member 2, and the inner weir wall face 20a in a part or whole of the lower half Ls is inclined toward the outer side. In this manner, in the bearing device 1 for a vehicle wheel, muddy water flowing along the outer circumference of the outer member 2 falls along the inclined weir wall face 20a smoothly and continuously, and does not whirl up due to traveling wind. Accordingly, muddy water can be prevented from reaching the seal member (the outer-side seal member 10). Therefore, the concern that the sealing performance (or durability) of the seal member (the outer-side seal member 10) lowers can be eliminated, and a damage of the rolling elements and the like can be prevented to increase the life of the bearing.

In addition, the weir portion 20 has guide grooves 20b for the hub bolts 40 on its outer edge. In more detail, the guide grooves 20b for passing the hub bolts 40 therethrough are formed by cutting the outer edge of the weir portion 20 into arc shape.

In the bearing device 1 for a vehicle wheel thus designed, even when the height of the weir portion 20 is increased such that muddy water hardly passes over the weir portion, the hub bolt 40 can be exchanged without disassembling the outer member 2 and the inner member 3.

In addition, the bearing device 1 for a vehicle wheel have five hub bolts 40, and the hub bolts are circumferentially disposed at intervals of 72 degrees about the rotation axis L. Thus, the five guide grooves 20b are circumferentially formed on the outer edge of the weir portion 20 at intervals of 72 degrees about the rotation axis L. However, the guide grooves 20b may be provided at 10 locations, which is a multiple of 5. Here, the guide grooves 20b are formed at intervals of 36 degrees about the rotation axis L. The bearing device 1 for a vehicle wheel has five hub bolts 40. However, the bearing device 1 may have four hub bolts 40, and the four hub bolts 40 may be provided at intervals of 90 degrees about the rotation axis L. In this case, four guide grooves 20b are formed at intervals of 90 degrees about the rotation axis L. However, the guide grooves 20b may be provided at 8 or 12 locations, which is a multiple of 4.

With such a design, in the bearing device 1 for a vehicle wheel, as illustrated in FIG. 7, all of the hub bolts 40 can be aligned with all of the guide grooves 20b, facilitating the operation of exchanging the hub bolt 40.

Figure 8A:
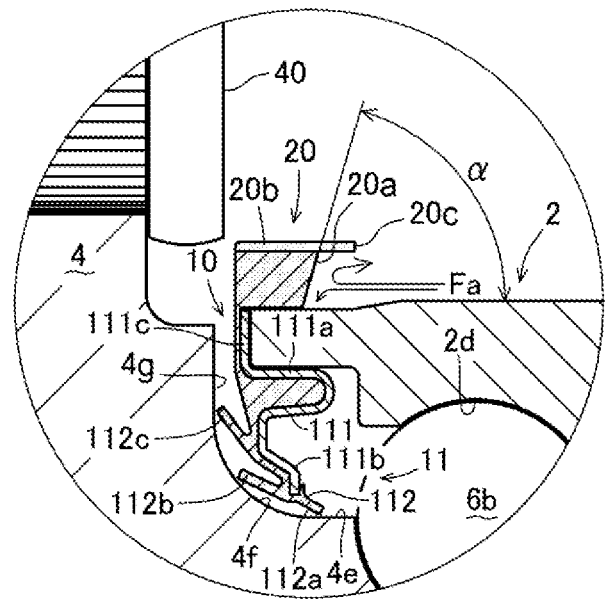
FIGS. 8A and 8B are axial sectional views illustrating a weir portion according to a second embodiment.

Next, with reference to FIG. 8, a weir portion 20 according to a second embodiment will be described in detail. FIG. 8A is an enlarged view of the region Ra in FIG. 2, and FIG. 8B is an enlarged view of the region Rb in FIG. 2. Unlike the weir portion 20 according to the first embodiment, the weir portion 20 according to this embodiment has a folded portion 20c extending toward an inner side on its outer edge.

The reason why the folded portion 20c is formed in the upper half Us of the outer member 2 is that muddy water hitting against the weir wall face 20a is prevented from scattering upward, and is allowed to scatter to the inner side and the lower side (see arrows Fa in FIG. 8A). Thereby, the effect of preventing the scattered muddy water from splashing over the weir portion 20 to reach the outer-side seal member 10 can be further enhanced.

Figure 8B:
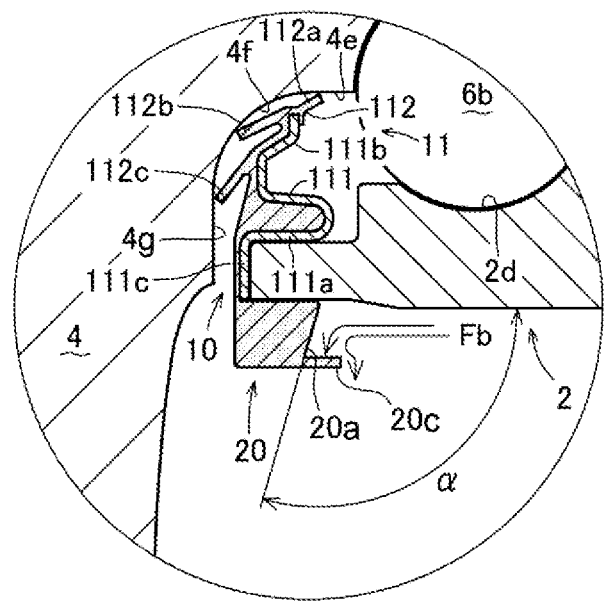

The reason why the folded portion 20c is formed in the lower half Ls of the outer member 2 is that muddy water adhered to the weir wall face 20a can be reliably removed and prevented from flowing around the outer edge of the weir wall face 20a (see arrows Fb in FIG. 8B). For this reason, the effect of preventing muddy water from whirling up due to traveling wind to reach the outer-side seal member 10 can be further enhanced.

As described above, the folded portion 20c extending toward the inner side may be formed on the outer edge of the weir portion 20 according to this embodiment. In this case, in the bearing device 1 for a vehicle wheel, since all of muddy water scatters to the inner side and the lower side, muddy water never reaches the seal member (the outer-side seal member 10). Muddy water does not flow around the outer edge of the weir wall face 20a and thus, never reaches the seal member (the outer-side seal member 10).

Figure 9A:
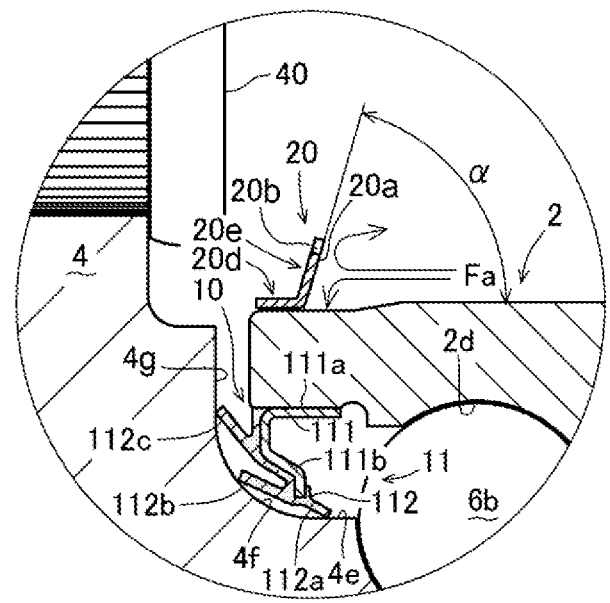
FIGS. 9A and 9B are axial sectional views illustrating a weir portion according to a third embodiment.
Figure 9B:
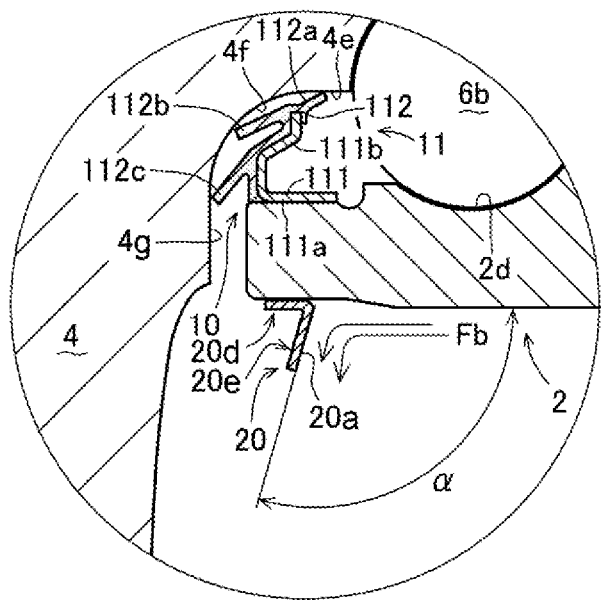
Figure 10:
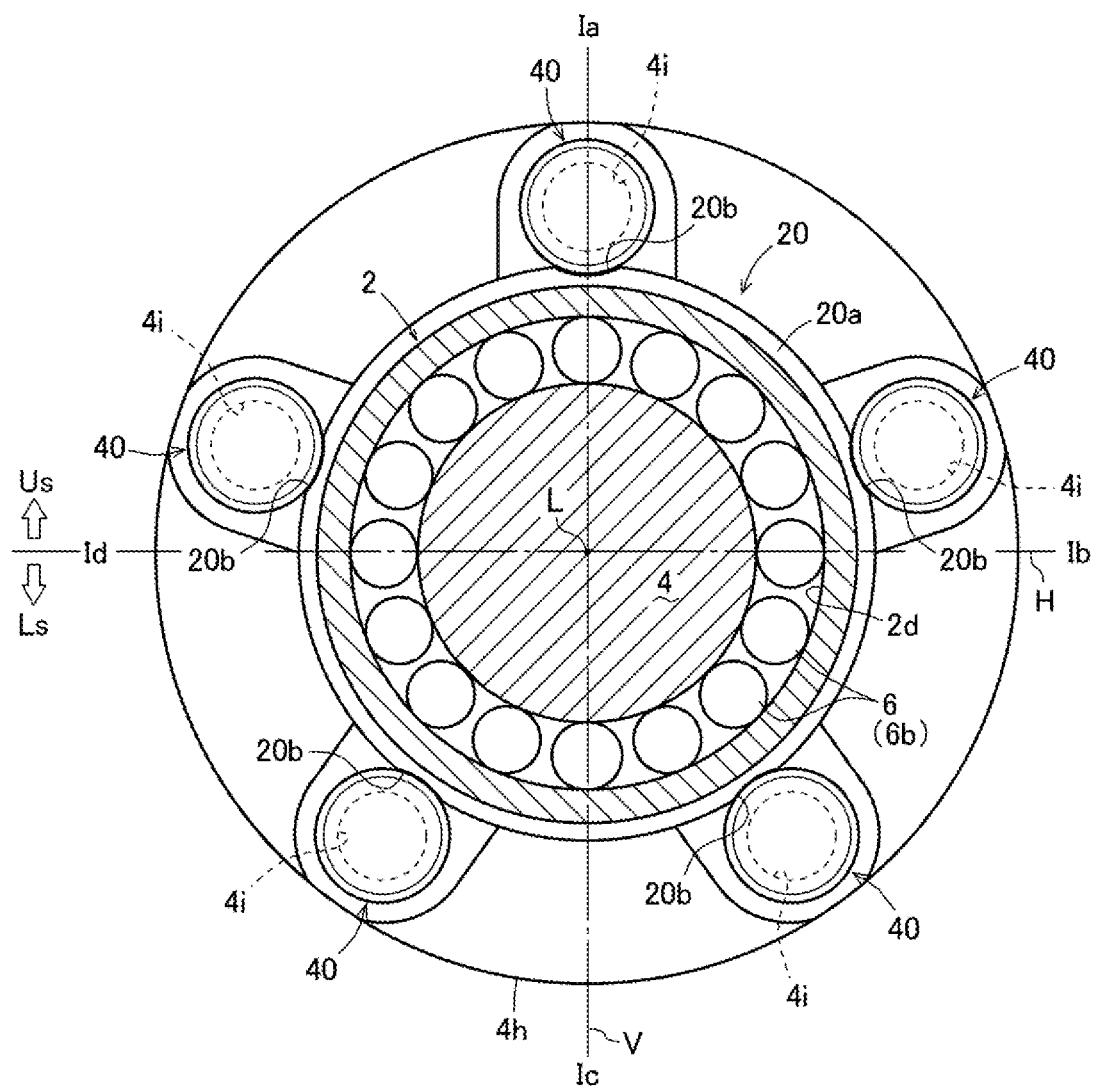
FIG. 10 is a radial sectional view illustrating a bearing device for a vehicle wheel provided with the weir portion according to the third embodiment.
Figure 11:
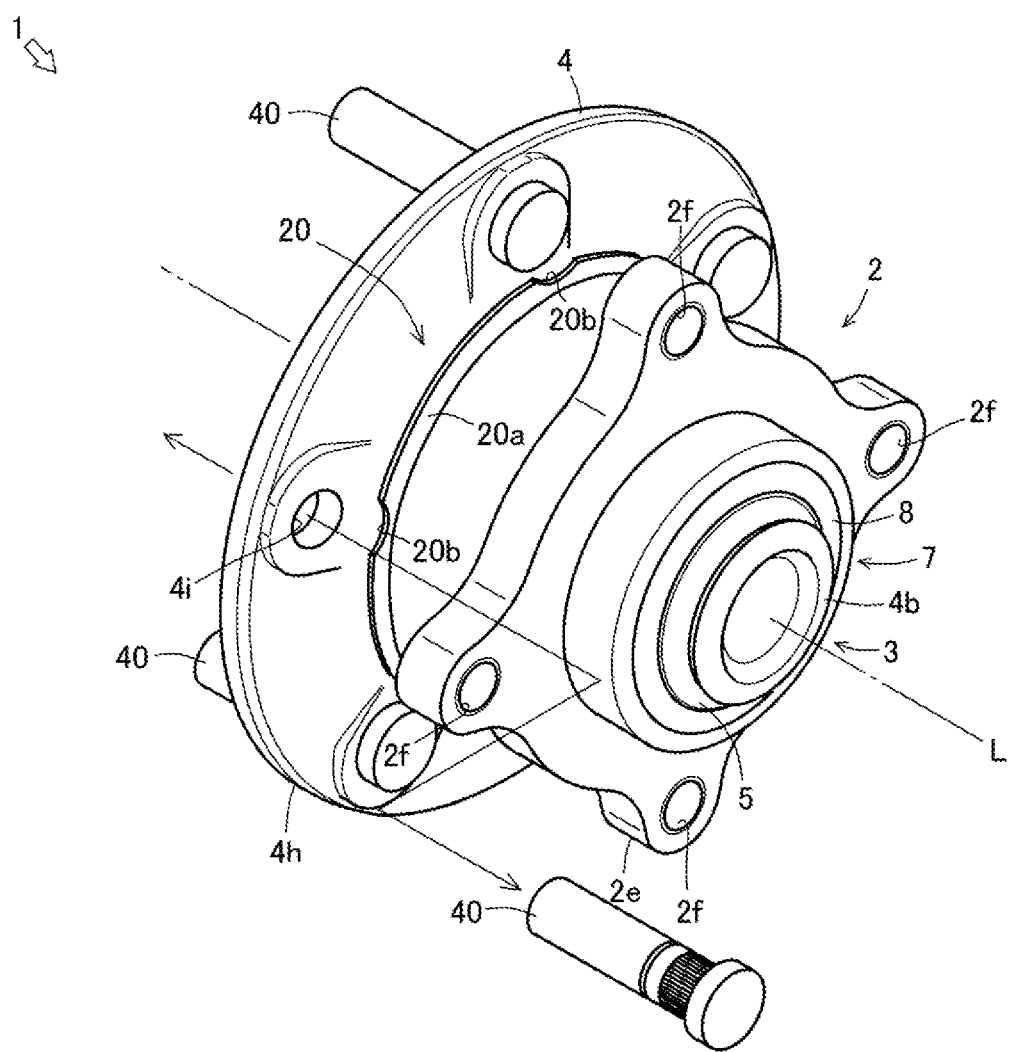
FIG. 11 is a view illustrating an operation of exchanging a hub bolt.

Next, with reference to FIG. 9 to FIG. 11, a weir portion 20 according to a third embodiment will be described in detail. FIG. 9A is an enlarged view of the region Ra in FIG. 2, and FIG. 9B is an enlarged view of the region Rb in FIG. 2. FIG. 10 is a view illustrating the cross section taken along VI-VI in FIG. 2. FIG. 11 illustrates an operation of exchanging the hub bolt 40.

The weir portion 20 according to the third embodiment is configured by fitting a separate component to the outer member 2. The weir portion 20 is formed of a ferritic stainless steel plate (such as SUS430 according to the JIS Standard), an austenite stainless steel plate (such as SUS304 according to the JIS Standard), or a rustproof cold-rolled steel plate (such as SPCC according to the JIS Standard). The weir portion 20 consists of a tubular portion 20d fitted (externally fitted) to the outer circumference of the outer member 2, and a side plate portion 20e radially extending from the inner side of the tubular portion 20d. An inner plane of the side plate portion 20e corresponds to the weir wall face 20a. The weir portion 20 is shaped like a ring about the rotation axis L of the inner member 3 (the hub wheel 4 and the inner wheel 5) (see FIG. 10). However, the weir portion 20 is not limited to a complete ring, and may lack a part of its circumference. Here, as illustrated in FIG. 10, when attached to the vehicle, given a vertical line V that intersects the rotation axis L of the inner member 3 (the hub wheel 4 and the inner wheel 5) and is parallel to a gravity-acting direction and a horizontal line H that intersects the rotation axis L of the inner member 3 (the hub wheel 4 and the inner wheel 5) and is perpendicular to the vertical line V, an upper half Us of the outer member 2 refers to the side above the horizontal line H, and a lower half Ls of the outer member 2 refers to the side below the horizontal line H. The radial outward direction is the direction of moving outward from the rotation axis L of the inner member 3 (the hub wheel 4 and the inner wheel 5).

The weir portion 20 according to this embodiment has a substantially wedge-typed axial cross section. The weir portion 20 is asymmetrical in the upper half Us and the lower half Ls of the outer member 2 (see FIGS. 9A and 9B). In the upper half Us of the outer member 2, the inner side plate portion 20e of the weir portion 20 is inclined toward the inner side in the radial outward direction. In the lower half Ls of the outer member 2, the inner side plate portion 20e of the weir portion 20 is inclined toward the outer side in the radial outward direction. Specifically, given that an imaginary line Ia extending upward from the rotation axis L has an phase angle of 0 degrees, an imaginary line Ib extending forward from the rotation axis L has a phase angle of 90 degrees, an imaginary line Ic extending downward from the rotation axis L has a phase angle of 180 degrees, and an imaginary line Id extending rearward from the rotation axis L has a phase angle of 270 degrees, in the axial cross section having the phase angle of 0 degrees, the inner side plate portion 20e is inclined the most to the inner side in the radial outward direction. In the axial cross section at the phase angle of 180 degrees, the inner side plate portion 20e is inclined the most toward the outer side in the radial outward direction. In the axial cross section at the phase angle of 90 degrees and the phase angle of 270 degrees, the inner side plate portion 20e is not inclined but is perpendicular to the rotation axis L. Note that in the weir portion 20, an inclination angle α of the side plate portion 20e smoothly changes at a certain rate with a change in the phase angle.

The reason why the side plate portion 20e in the upper half Us of the outer member 2 is inclined toward the inner side is that muddy water hitting against the side plate portion 20e is allowed to scatter to the inner side or the lower side (see arrows Fa in FIG. 9A). This has the effect of preventing the scattered muddy water from splashing over weir portion 20 to reach the outer-side seal member 10.

As described above, the weir portion 20 according to this embodiment is asymmetrical in the upper half Us and the lower half Ls of the outer member 2, and the inner weir wall face 20a in a part or whole of the upper half Us is inclined toward the inner side in the radial outward direction. As a result, in the bearing device 1 for a vehicle wheel, even when muddy water hits against the weir wall face 20a of the weir portion 20 and scatters, the scattered muddy water do not splash over the weir portion 20, preventing muddy water from reaching the seal member (the outer-side seal member 10). Therefore, the concern that the sealing performance (or durability) of the seal member (the outer-side seal member 10) lowers can be eliminated, and a damage of the rolling elements and the like can be prevented to increase the life of the bearing.

The reason why the inner weir wall face 20a in the lower half Ls of the outer member 2 is inclined toward the outer side in the radial outward direction is that muddy water flowing along the outer circumference of the outer member 2 is not allowed to disperse due to traveling wind, but flows down together (see arrows Fb in FIG. 9B). This achieves the effect of preventing muddy water from whirling up due to traveling wind to reach the outer-side seal member 10.

As described above, the weir portion 20 according to this embodiment is asymmetrical in the upper half Us and the lower half Ls of the outer member 2, and the inner weir wall face 20a in a part or whole of the lower half Ls is inclined toward the outer side. In this manner, in the bearing device 1 for a vehicle wheel, muddy water flowing along the outer circumference of the outer member 2 falls along the inclined weir wall face 20a smoothly and continuously, and does not whirl up due to traveling wind. Accordingly, muddy water can be prevented from reaching the seal member (the outer-side seal member 10). Therefore, the concern that the sealing performance (or durability) of the seal member (the outer-side seal member 10) lowers can be eliminated, and a damage of the rolling elements and the like can be prevented to increase the life of the bearing.

In addition, the weir portion 20 has guide grooves 20b for the hub bolts 40 on its outer edge. In more detail, the guide grooves 20b for passing the hub bolts 40 therethrough are formed by cutting the outer edge of the weir portion 20 into arc shape.

In the bearing device 1 for a vehicle wheel thus designed, even when the height of the weir portion 20 is increased such that muddy water hardly passes over the weir portion, the hub bolt 40 can be exchanged without disassembling the outer member 2 and the inner member 3.

Figure 12A:
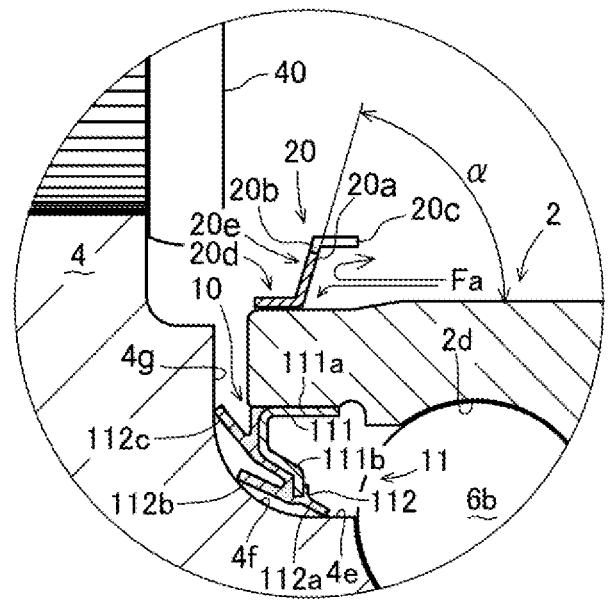
FIGS. 12A and 12B are axial sectional views illustrating a weir portion according to a fourth embodiment.
Figure 12B:
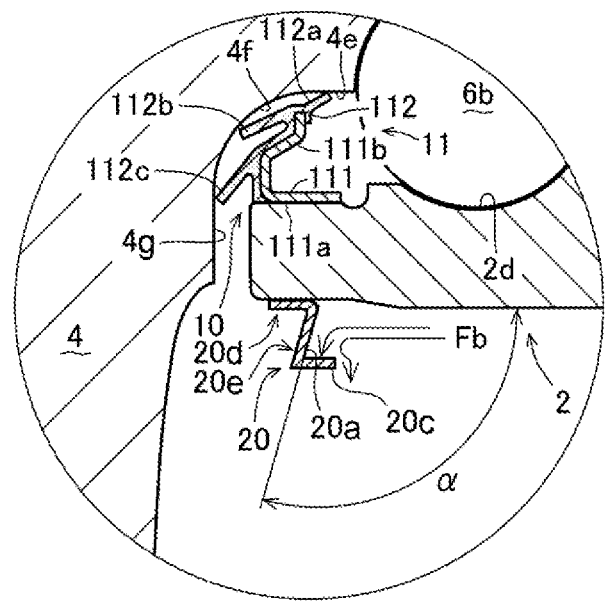

Next, with reference to FIGS. 12A and 12B, a weir portion 20 according to a fourth embodiment will be described in detail. FIG. 12A is an enlarged view of the region Ra in FIG. 2, and FIG. 12B is an enlarged view of the region Rb in FIG. 2. Unlike the weir portion 20 according to the third embodiment, the weir portion 20 according to this embodiment has a folded portion 20c extending toward the inner side on its outer edge.

The reason why the folded portion 20c is formed in the upper half Us of the outer member 2 is that muddy water hitting against the weir wall face 20a is prevented from scattering upward, and is allowed to scatter to the inner side and the lower side (see arrows Fa in FIG. 12A). Thereby, the effect of preventing the scattered muddy water from splashing over the weir portion 20 to reach the outer-side seal member 10 can be further enhanced.

The reason why the folded portion 20c is formed in the lower half Ls of the outer member 2 is that muddy water adhered to the weir wall face 20a can be reliably removed and prevented from flowing around the outer edge of the weir wall face 20a (see arrows Fb in FIG. 12B). For this reason, the effect of preventing muddy water from whirling up due to traveling wind to reach the outer-side seal member 10 can be further enhanced.

As described above, the folded portion 20c extending toward the inner side may be formed on the outer edge of the weir portion 20 according to this embodiment. In this case, in the bearing device 1 for a vehicle wheel, since all of muddy water scatters to the inner side and the lower side, muddy water never reaches the seal member (the outer-side seal member 10). Muddy water does not flow around the outer edge of the weir wall face 20a and thus, never reaches the seal member (the outer-side seal member 10).

Figure 13A:
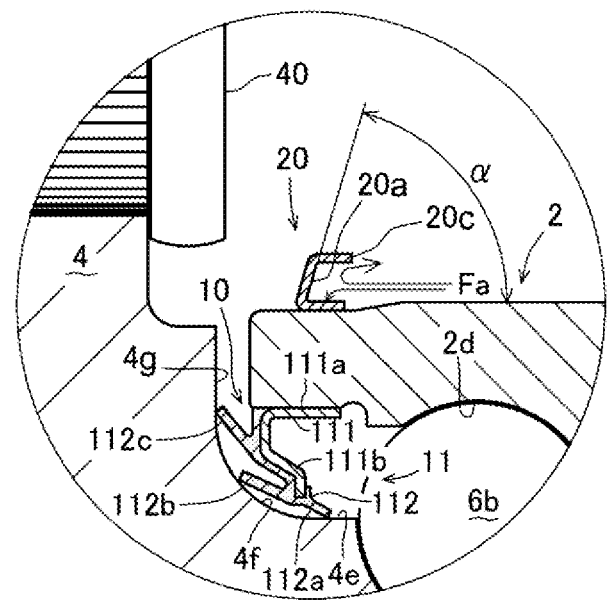
FIGS. 13A and 13B are axial sectional views illustrating a weir portion according to a fifth embodiment.
Figure 13B:
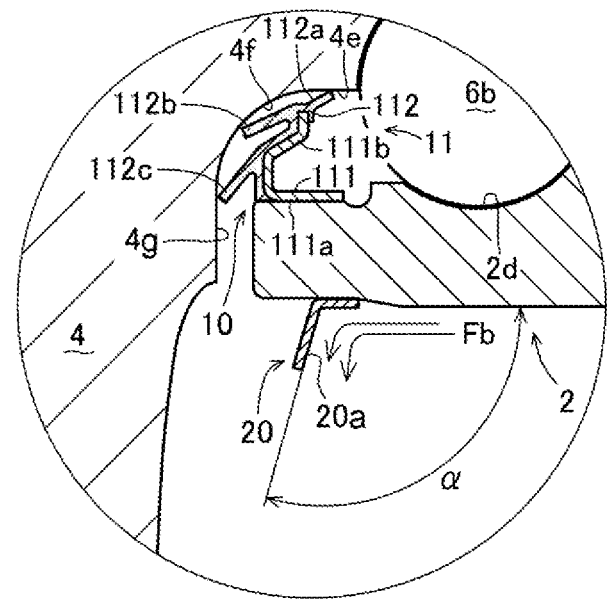

Next, with reference to FIGS. 13A and 13B, a weir portion 20 according to a fifth embodiment will be described in detail. FIG. 13A is an enlarged view of the region Ra in FIG. 2, and FIG. 13B is an enlarged view of the region Rb in FIG. 2.

The weir portion 20 is asymmetrical in the upper half Us and the lower half Ls of the outer member 2, and in the upper half Us of the outer member 2, the weir wall face 20a of the weir portion 20 is inclined toward the inner side in the radial outward direction. In the lower half Ls of the outer member 2, the weir wall face 20a of the weir portion 20 is inclined toward the outer side in the radial outward direction.

In the upper half Us of the outer member 2, the folded portion 20c is also formed. This intends to prevent muddy water hitting against the weir wall face 20a from scattering upward, and to allow all of muddy water to scatter toward the inner side and the lower side (see arrows Fa in FIG. 13A). Thereby, the effect of preventing the scattered muddy water from splashing over the weir portion 20 to reach the outer-side seal member 10 can be further enhanced.

Further, in this embodiment, in the upper half Us of the outer member 2, the height of the weir portion 20 is decreased. That is, since the outer edge of the weir portion 20 is bent to form the folded portion 20c, the height of the weir portion 20 is decreased. For this reason, in the upper half Us of the outer member 2, the weir portion 20 presents no obstacle at exchange of the hub bolt 40. Therefore, in the bearing device 1 for a vehicle wheel, the hub bolt 40 can be exchanged without disassembling the outer member 2 and the inner member 3.

Figure 14A:
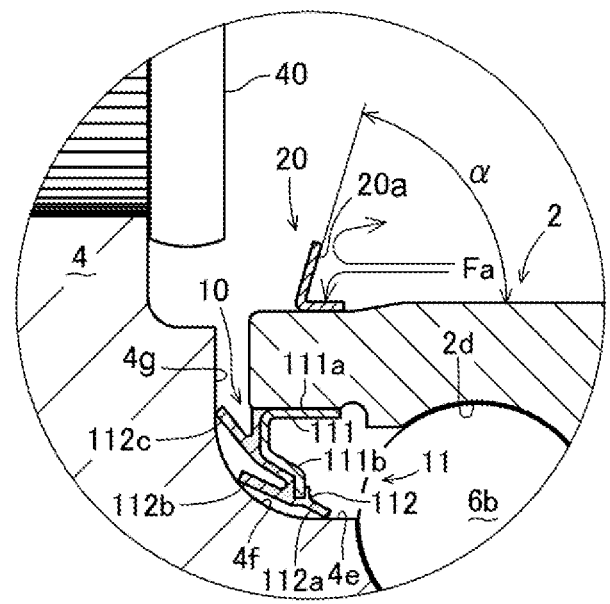
FIGS. 14A and 14B are axial sectional views illustrating a weir portion according to a sixth embodiment.
Figure 14B:
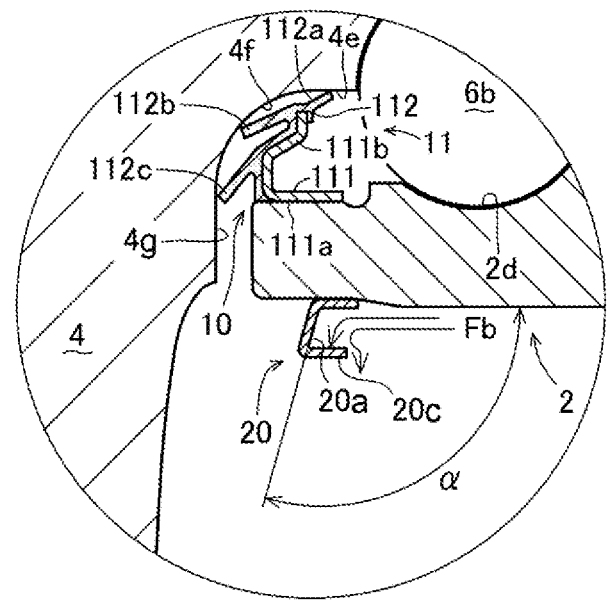

Next, with reference to FIGS. 14A and 14B, a weir portion 20 according to a sixth embodiment will be described in detail. FIG. 14A is an enlarged view of the region Ra in FIG. 2, and FIG. 14B is an enlarged view of the region Rb in FIG. 2.

The weir portion 20 is asymmetrical in the upper half Us and the lower half Ls of the outer member 2, and in the upper half Us of the outer member 2, the weir wall face 20a of the weir portion 20 is inclined toward the inner side in the radial outward direction. In the lower half Ls of the outer member 2, the weir wall face 20a of the weir portion 20 is inclined toward the outer side in the radial outward direction.

In the lower half Ls of the outer member 2, the folded portion 20c is formed. This intends to reliably remove muddy water adhered to the weir wall face 20a, and prevent muddy water from flowing around the outer edge of the weir wall face 20a (see arrows Fb in FIG. 14B). For this reason, the effect of preventing muddy water from whirling up due to traveling wind to reach the outer-side seal member 10 can be further enhanced.

Further, in this embodiment, in the lower half Ls of the outer member 2, the height of the weir portion 20 is decreased. That is, since the outer edge of the weir portion 20 is bent to form the folded portion 20c, the height of the weir portion 20 is decreased. For this reason, in the lower half Ls of the outer member 2, the weir portion 20 presents no obstacle at exchange of the hub bolt 40. Therefore, in the bearing device 1 for a vehicle wheel, the hub bolt 40 can be exchanged without disassembling the outer member 2 and the inner member 3.

Figure 15:
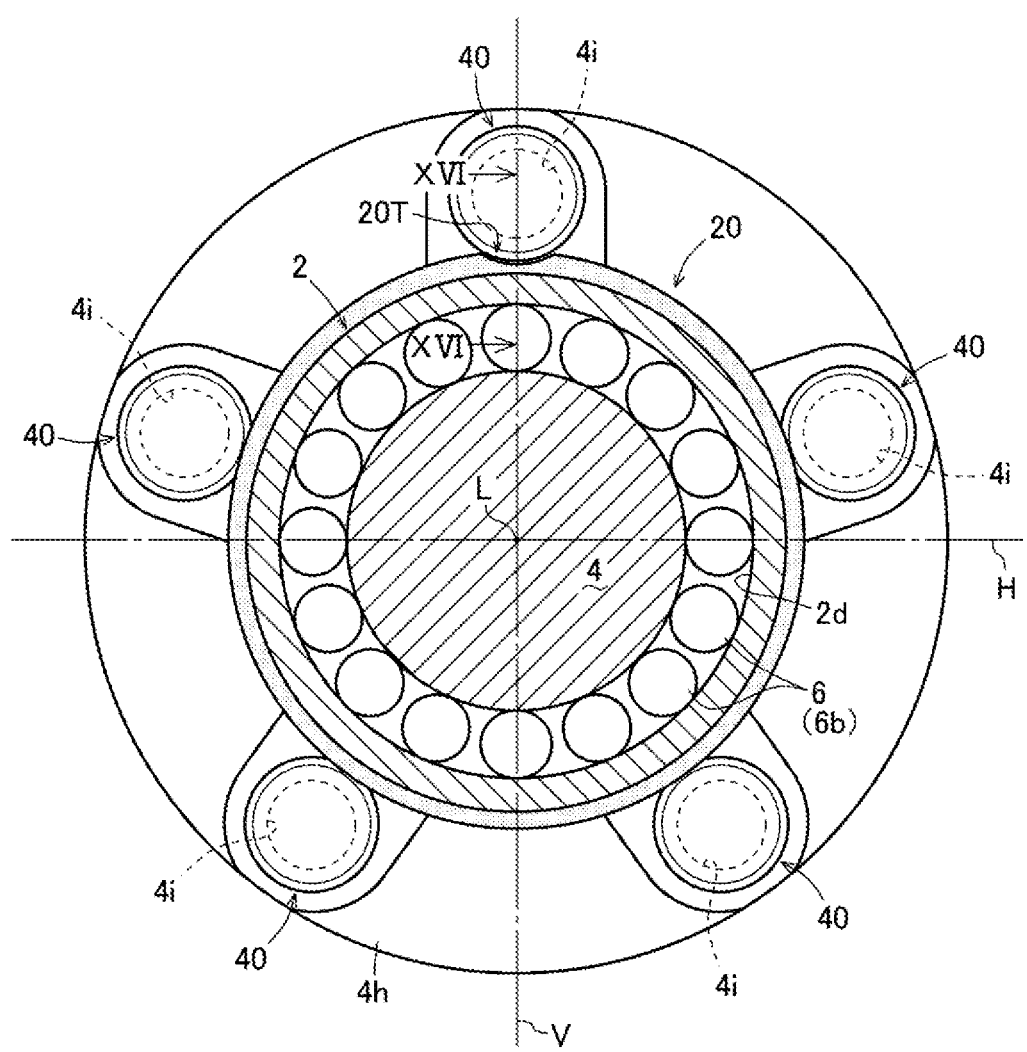
FIG. 15 is a radial sectional view illustrating a bearing device for a vehicle wheel provided with a weir portion according to a seventh embodiment.
Figure 16:
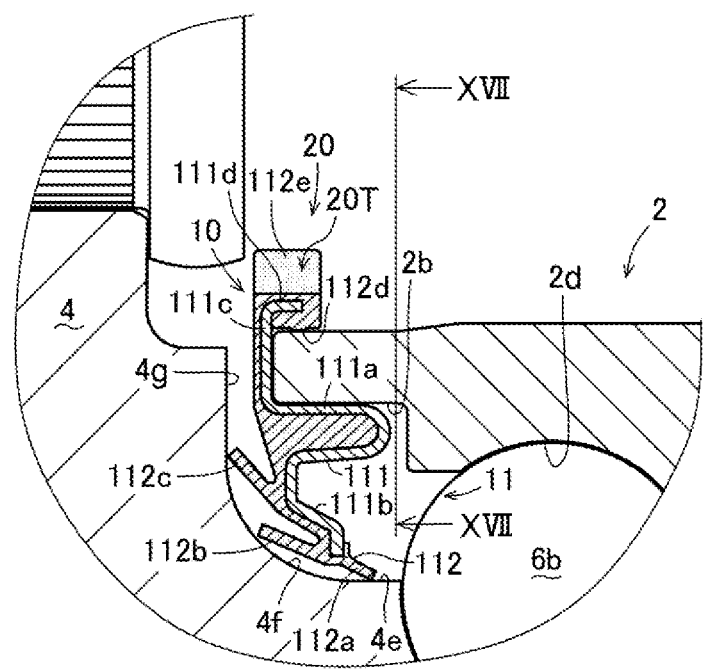
FIG. 16 is an axial sectional view illustrating the weir portion according to the seventh embodiment.
Figure 17:
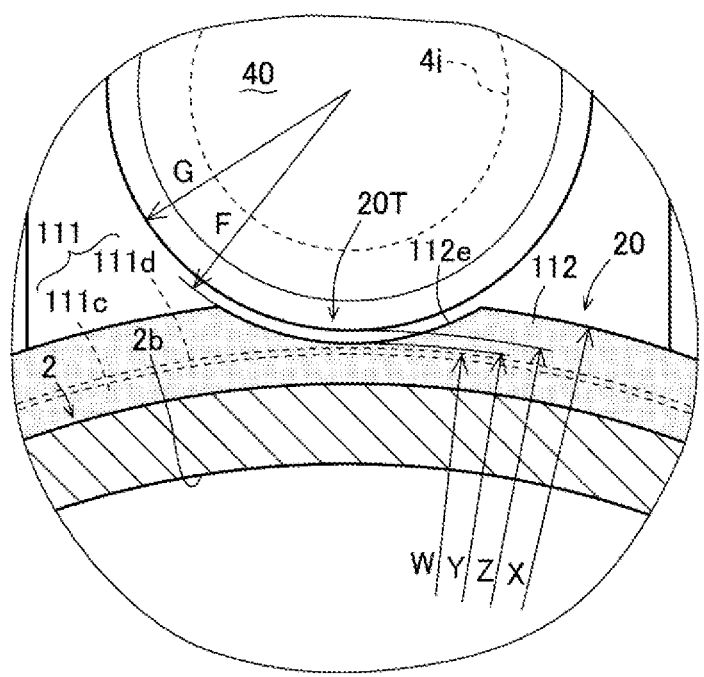
FIG. 17 is a radial sectional view illustrating the weir portion according to the seventh embodiment.

Next, with reference to FIG. 15 to FIG. 17, a weir portion 20 according to a seventh embodiment will be described in detail. FIG. 15 is a view illustrating a cross section along VI-VI in FIG. 2. FIG. 16 is a view illustrating a cross section along XVI-XVI in FIG. 15. FIG. 17 is a view illustrating a cross section along XVII-XVII in FIG. 16. Hereinafter, the guide grooves 20b are described as guide grooves 20T.

Here, as illustrated in FIG. 15, in the state where the bearing device 1 for a vehicle wheel is attached to the vehicle body, the straight line that intersects with the rotation axis L of the inner member 3 (the hub wheel 4 and the inner wheel 5) and is parallel to the gravity-acting direction is defined as the vertical line V. The straight line that intersects with the rotation axis L of the inner member 3 (the hub wheel 4 and the inner wheel 5) and is perpendicular to the vertical line V is defined as the horizontal line H. The radial outward direction is the direction of moving away from the rotation axis L of the inner member 3 (the hub wheel 4 and the inner wheel 5). The radial inward direction is the direction of moving closer to the rotation axis L of the inner member 3 (the hub wheel 4 and the inner wheel 5).

As illustrated in FIG. 16, in the outer-side seal member 10, the core metal 111 has a stop plate portion 111c extending along the outer-side end face of the outer member 2 in the radial outward direction. An axially extending folded portion 111d is formed on the outer edge of the stop plate portion 111c. In detail, the tubular folded portion 111d extending toward the inner side is formed on the outer edge of the stop plate portion 111c by bending the stop plate portion 111c with a predetermined distance from the outer circumference of the outer member 2. The folded portion 111d is substantially perpendicular to the stop plate portion 111c connected to the fitting portion 111a, advantageously increasing the stiffness of the fitting portion 111a.

Further, the seal rubber 112 of the outer-side seal member 10 encloses the outer edge portion (a portion including a part of the stop plate portion 111c and the whole of the folded portion 111d) of the core metal 111. That is, the seal rubber covers the surface of the outer edge portion (a portion including a part of the stop plate portion 111c and the whole of the folded portion 111d) of the core metal 111, from the outer side to the inner side. In this manner, the outer-side seal member 10 constitutes the weir portion 20 on the outer circumference of the outer member 2. Accordingly, the weir portion 20 refers to a portion of the core metal 111 and the seal rubber 112 covering the core metal 111, which protrudes from the outer circumference of the outer member 2 in the radial outward direction. The weir portion 20 is shaped like a ring about the rotation axis L of the inner member 3 (the hub wheel 4 and the inner wheel 5) (see FIG. 15). However, the weir portion 20 is not limited to a complete ring, and may lack a part of its circumference.

An axial penetrating groove 112e is formed on the outer circumference of the seal rubber 112. That is, the penetrating groove 112e penetrating along the folded portion 111d from the inner-side end face to the outer-side end face is provided on the outer circumference of the seal rubber 112. As illustrated in FIG. 17, the penetrating groove 112e is arc-shaped when viewed in the axial direction, and a radius F of the penetrating groove 112e is slightly larger than a radius G of the head of the hub bolt 40. In this manner, the guide grooves 20T for passing the respective hub bolts 40 therethrough are formed on the outer circumference of the weir portion 20. Thus, the guide groove 20T refers to a portion, on the outer circumference of the weir portion 20, dented in the radial inward direction, which is formed by providing the penetrating groove 112e on the seal rubber 112. Given that the diameter of the folded portion 111d of the core metal 111 is W, the diameter of the seal rubber 112 is X, the diameter of a virtual circle that abuts the penetrating groove 112e of the seal rubber 112 is Y, and the diameter of a virtual circle that abuts the head of the hub bolt 40 is Z, the relation satisfies $W<Y<Z<X$.

As described above, the outer-side seal member 10 is configured such that the seal rubber 112 is integrally bonded to the core metal 111 by vulcanization, and has the weir portion 20 fitted to the outer circumference of the outer member 2. The weir portion 20 has the folded portion 111d formed by bending the core metal 111 to the axial inner side, the core metal 111 extending along the outer-side end face of the outer member 2 in the radial outward direction further than the outer member 2. The seal rubber 112 is integrally bonded to the folded portion 111d by vulcanization. The guide grooves 20T for passing the respective hub bolts 40 therethrough are formed on the outer circumference of the seal rubber 112. The bearing device 1 for a vehicle wheel can increase the stiffness of the core metal 111 to suppress a distortion of the fitting portion 111a. Therefore, the force to fit the core metal 111 to the outer member 2 can be increased, thereby preventing the seal member (the outer-side seal member 10) from being detached, and water from entering into the fitting portion of the seal member (the outer-side seal member 10) to the outer member 2. In addition, by providing the core metal 111 with the folded portion 111d, the adhesion area of the seal rubber 112 is increased to suppress peeling and crack of the seal rubber 112.

Figure 18:
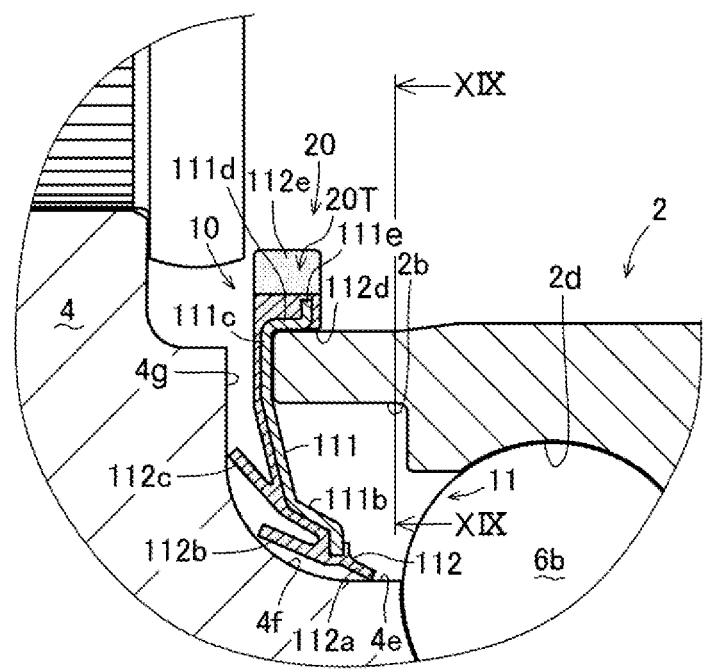
FIG. 18 is an axial sectional view illustrating a weir portion according to an eighth embodiment.
Figure 19:
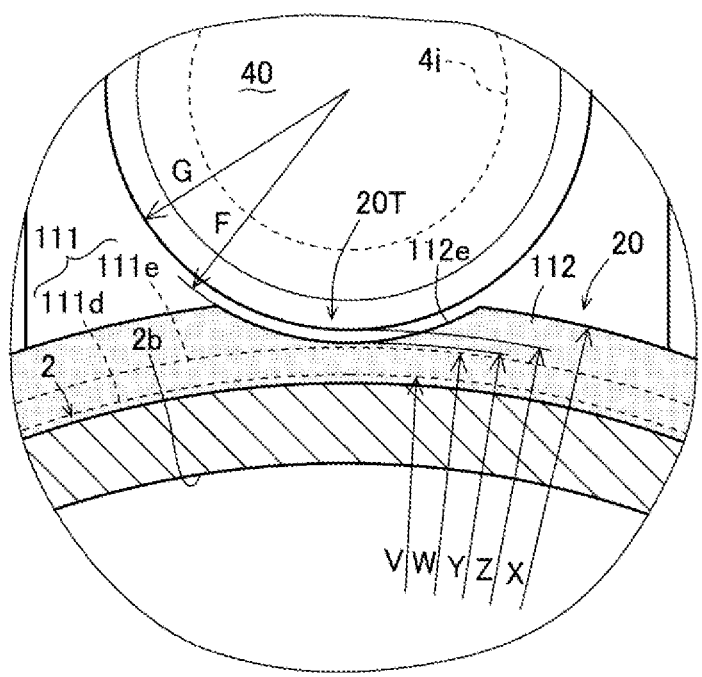
FIG. 19 is a radial sectional view illustrating the weir portion according to the eighth embodiment.

Next, with reference to FIG. 18 and FIG. 19, a weir portion 20 according to an eighth embodiment will be described in detail. FIG. 18 is a view illustrating a cross section along XVI-XVI in FIG. 15. FIG. 19 is a view illustrating a cross section along XIX-XIX in FIG. 18.

As illustrated in FIG. 18, in the outer-side seal member 10, the core metal 111 does not have a fitting portion 111a fitted to the inner circumference of the outer member 2, but has a disc-like side plate portion 111b extending toward the inner member 3 (the hub wheel 4) and a disc-like stop plate portion 111c extending along the outer-side end face of the outer member 2 in the radial outward direction, which are continuously formed. An axially extending folded portion 111d is formed on the outer edge of the stop plate portion 111c. In detail, the tubular folded portion 111d extending toward the inner side is formed on the outer edge of the stop plate portion 111c by bending the stop plate portion 111c so as to abut the outer circumference of the outer member 2. The folded portion 111d achieves the function of the fitting portion. Further, a collar portion 111e extending in the radial outward direction is formed at a tip of the folded portion 111d. In detail, the disc-like collar portion 111e extending in the radial outward direction is formed at the tip of the folded portion 111d by bending the folded portion 111d perpendicularly to the outer circumference of the outer member 2. The collar portion 111e is substantially perpendicular to the folded portion 111d, to increase the stiffness of the folded portion 111d having the function of the fitting portion.

Further, the seal rubber 112 of the outer-side seal member 10 encloses the outer edge portion (a portion including the outer circumference of the folded portion 111d and the whole of the collar portion 111e) of the core metal 111. That is, the seal rubber covers the surface of the outer edge portion (a portion including the outer circumference of the folded portion 111d and the whole of the collar portion 111e) of the core metal 111, from the outer side to the inner side. In this manner, the outer-side seal member 10 constitutes the weir portion 20 on the outer circumference of the outer member 2. Accordingly, the weir portion 20 refers to a portion of the core metal 111 and the seal rubber 112 covering the core metal 111, which protrudes from the outer circumference of the outer member 2 in the radial outward direction. The weir portion 20 is shaped like a ring about the rotation axis L of the inner member 3 (the hub wheel 4 and the inner wheel 5). However, the weir portion 20 is not limited to a complete ring, and may lack a part of its circumference.

An axial penetrating groove 112e is formed on the outer circumference of the seal rubber 112. That is, the penetrating groove 112e penetrating along the folded portion 111d from the inner-side end face to the outer-side end face is provided on the outer circumference of the seal rubber 112. As illustrated in FIG. 19, the penetrating groove 112e is arc-shaped when viewed in the axial direction, and a radius F of the penetrating groove 112e is slightly larger than a radius G of the head of the hub bolt 40. In this manner, the guide grooves 20T for passing the respective hub bolts 40 therethrough are formed on the outer circumference of the weir portion 20. Thus, the guide groove 20T refers to a portion, on the outer circumference of the weir portion 20, dented in the radial inward direction, which is formed by providing the penetrating groove 112e on the seal rubber 112. Given that the diameter of the folded portion 111d of the core metal 111 is V, the diameter of the collar portion 111e of the core metal 111 is W, the diameter of the seal rubber 112 is X, the diameter of a virtual circle that abuts the penetrating groove 112e of the seal rubber 112 is Y, and the diameter of the a virtual circle that abuts the head of the hub bolt 40 is Z, the relation satisfies V<W<Y<Z<X.

As described above, in the outer-side seal member 10, the seal rubber 112 is integrally bonded to the core metal 111 by vulcanization, and the outer-side seal member 10 has the weir portion 20 fitted to the outer circumference of the outer member 2. The weir portion 20 has the folded portion 111d formed by bending the core metal 111 to the axial inner side, the core metal 111 extending along the outer-side end face of the outer member 2 in the radial outward direction further than the outer member 2, and the collar portion 111e formed by bending a tip of the folded portion 111d and extending in the radial outward direction. The seal rubber 112 is integrally bonded to the folded portion 111d and the collar portion 111e by vulcanization. The guide grooves 20T for passing the respective hub bolts 40 therethrough are formed on the outer circumference of the seal rubber 112. The bearing device 1 for a vehicle wheel can increase the stiffness of the core metal 111 to suppress a distortion of the folded portion 111d having the function of the fitting portion. Therefore, the force to fit the core metal 111 to the outer member 2 can be increased, thereby preventing the seal member (the outer-side seal member 10) from being detached, and water from entering into the fitting portion of the seal member (the outer-side seal member 10) to the outer member 2. In addition, since the core metal 111 has no fitting portion 111a fitted to the inner circumference of the outer member 2, the material for the core metal can be reduced to reduce costs. In addition, by providing the core metal 111 with the folded portion 111d and the collar portion 111e, the adhesion area of the seal rubber 112 is increased to suppress peeling-off and crack of the seal rubber 112.

Next, with reference to FIG. 20 and FIG. 21, a weir portion 20 according to a ninth embodiment will be described in detail.

Here, in addition to the vertical line V and the horizontal line H, a straight line having a phase angle of 45 degrees from the vertical line V about the rotation axis L and a straight line having a phase angle of 45 degrees from the horizontal line H about the rotation axis L are defined as inclined line S.

Figure 20:
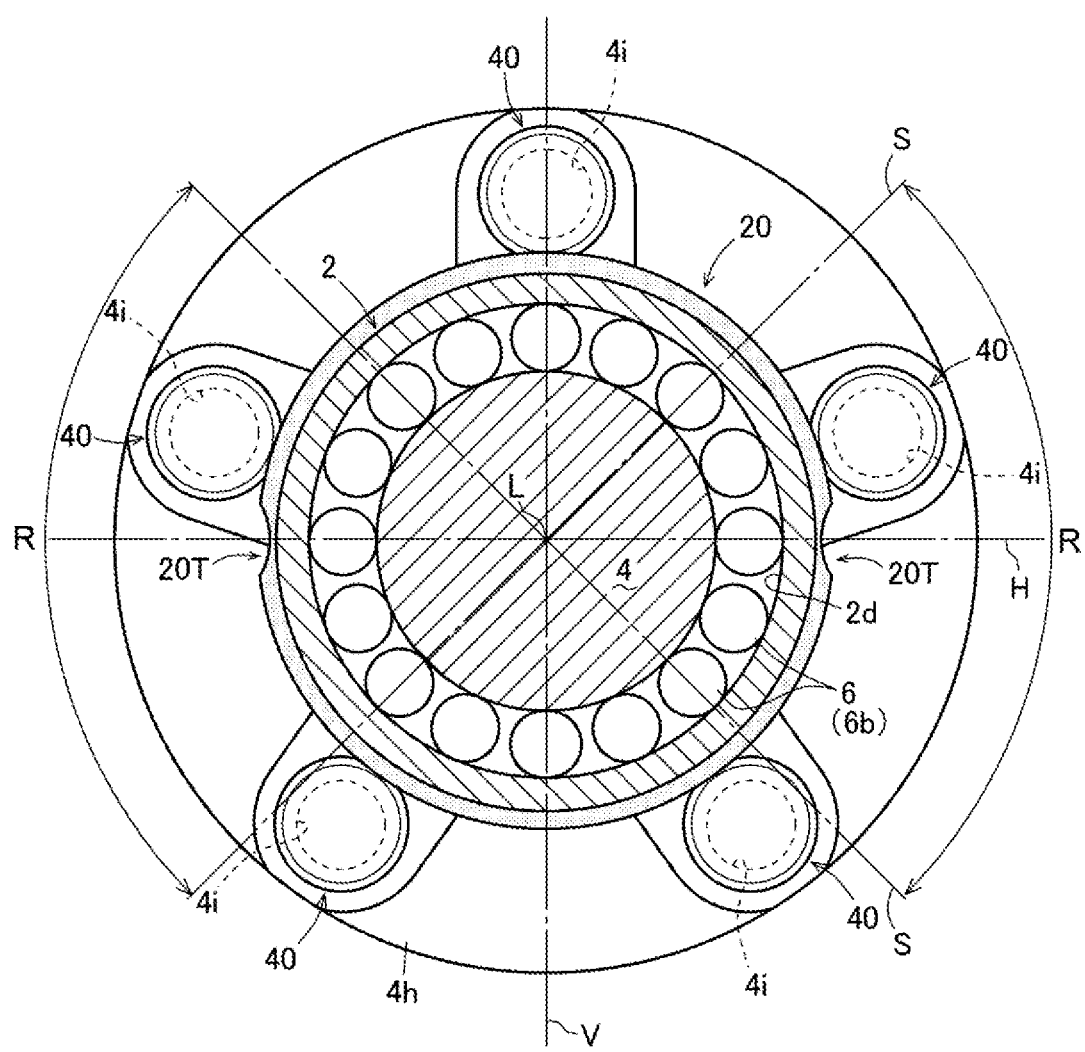
FIG. 20 is a radial sectional view illustrating a bearing device for a vehicle wheel provided with a weir portion according to a ninth embodiment.

As illustrated in FIG. 20, in the weir portion 20 according to the ninth embodiment, two guide grooves 20T are circumferentially formed at intervals of 180 degrees about the rotation axis L. The outer-side seal member 10 is attached such that the guide grooves 20T intersect with the horizontal line H. However, the outer-side seal member 10 may be attached such that the guide grooves 20T are located in the vicinity of the horizontal line H. The "vicinity" means the range between the two inclined lines S including the horizontal line H (see a range R in FIG. 20).

Figure 21:
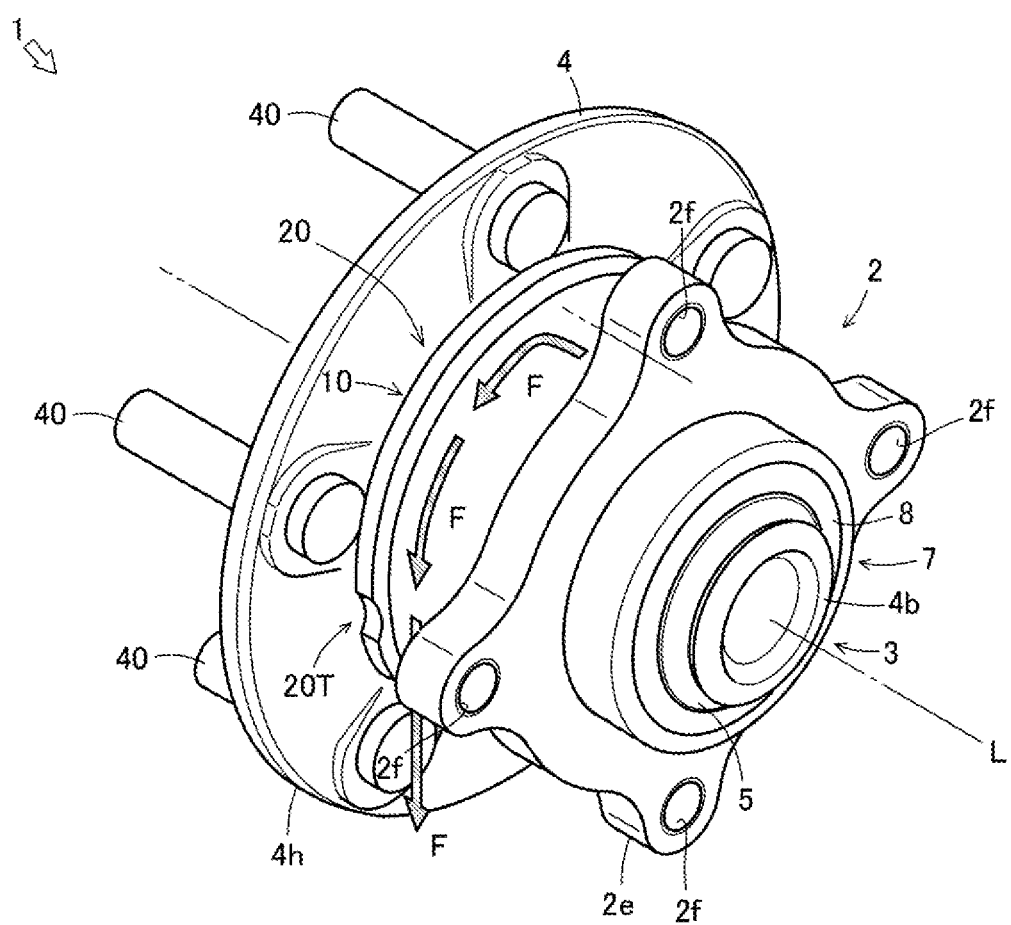
FIG. 21 is a view illustrating a direction in which muddy water flows.

As illustrated in FIG. 21, muddy water is intercepted by the weir portion 20 and then, falls down on the outer circumference of the outer member 2 along the weir portion 20 (see arrows F in FIG. 21). Therefore, if only the guide grooves 20T are formed to intersect with or to be located in the vicinity of the horizontal line H, muddy water does not pass the guide grooves 20T. That is, muddy water falls down in a gravitational direction and thus, does not pass the guide grooves 20T that are perpendicular to the gravitational direction.

As described above, the guide grooves 20T are formed to intersect with or to be located in the vicinity of the horizontal line H. The bearing device 1 for a vehicle wheel can prevent muddy water from passing through the guide grooves 20T and reaching the seal member (the outer-side seal member 10). Therefore, the concern that the sealing performance of the seal member (the outer-side seal member 10) lowers can be eliminated off, and a damage of the rolling elements 6 and the like can be prevented to increase the life of the bearing.

Figure 22:
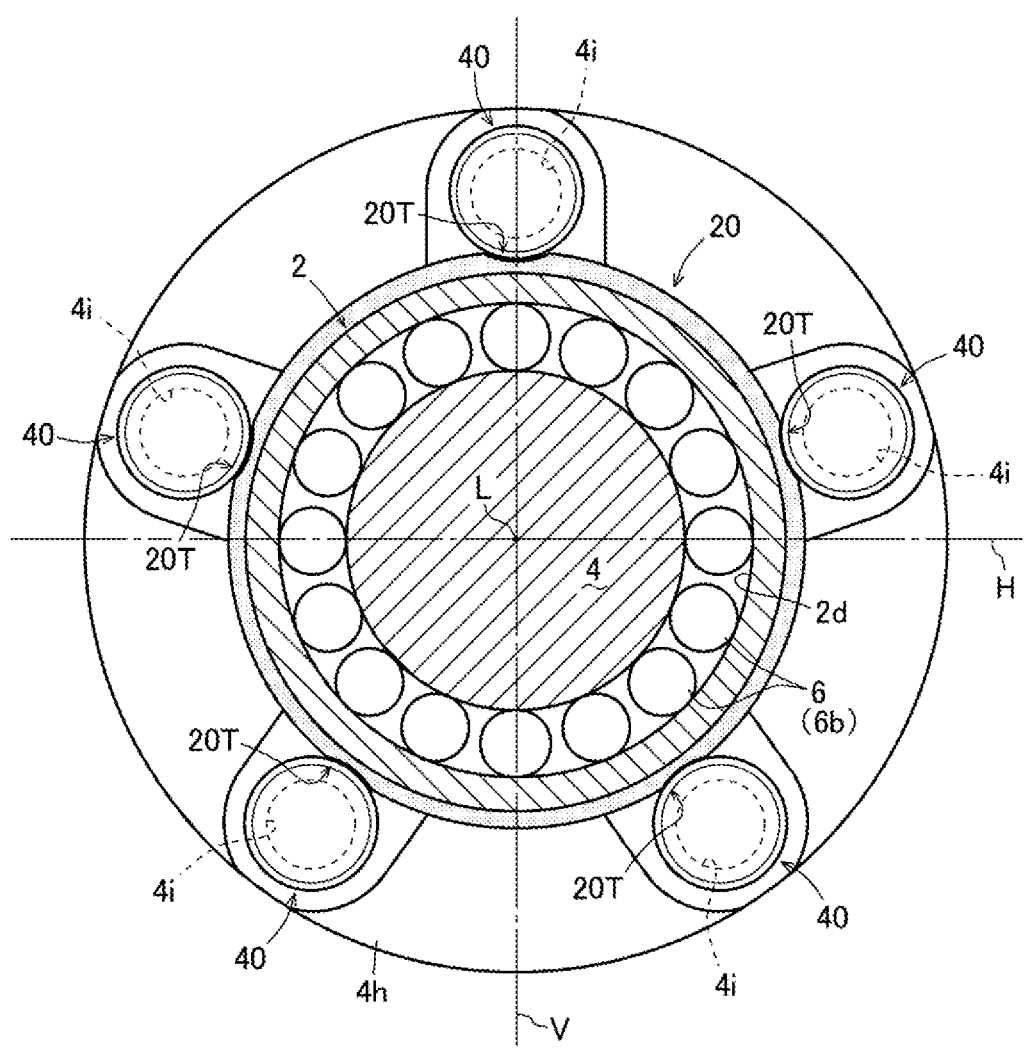
FIG. 22 is a radial sectional view illustrating a bearing device for a vehicle wheel provided with a weir portion according to a tenth embodiment.

Next, with reference to FIG. 22 and FIG. 23, a weir portion 20 according to a tenth embodiment will be described in detail.

The bearing device 1 for a vehicle wheel has five hub bolts 40, and the hub bolts are provided at regular intervals of the phase angle of 72 degrees about the rotation axis L. For this reason, five guide grooves 20T are circumferentially formed on the outer circumference of the weir portion 20 at regular intervals of the phase angle of 72 degrees about the rotation axis L. However, the guide grooves 20T may be provided at 10 locations, which is a multiple of 5. Here, the guide grooves 20T are formed at regular intervals of the phase angle of 36 degrees about the rotation axis L. Although the bearing device 1 for a vehicle wheel has five hub bolts 40, the bearing device 1 for a vehicle wheel may have four hub bolts 40 and the hub bolts 40 may be provided at regular intervals of the phase angle of 90 degrees about the rotation axis L. In this case, four guide grooves 20T are formed at regular intervals of the phase angle of 90 degrees about the rotation axis L. However, the guide grooves 20T may be provided at 8 or 12 locations, which is a multiple of 4.

Figure 23:
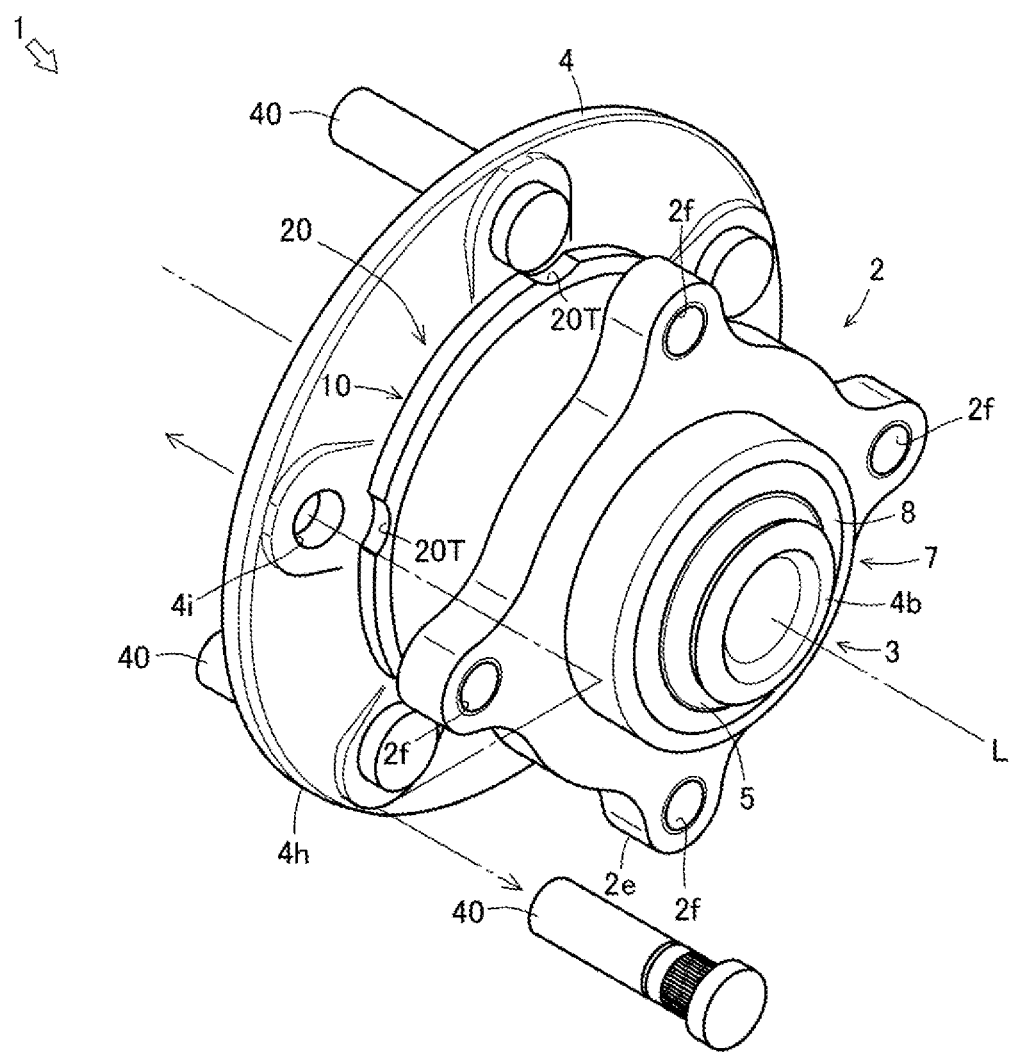
FIG. 23 is a view illustrating an operation of exchanging a hub bolt.
Figure 24A:
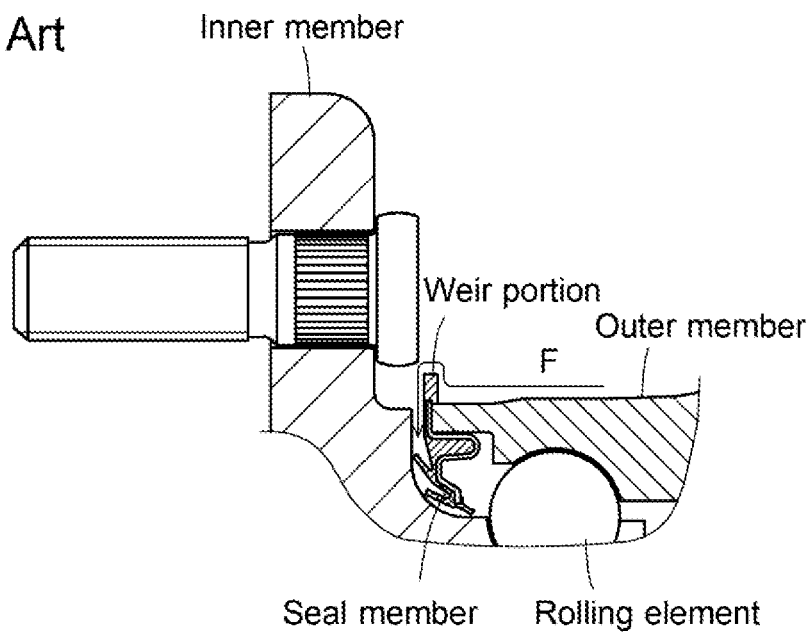
FIGS. 24A and 24B are sectional views illustrating a partial configuration of a conventional bearing device for a vehicle wheel.
Figure 24B:
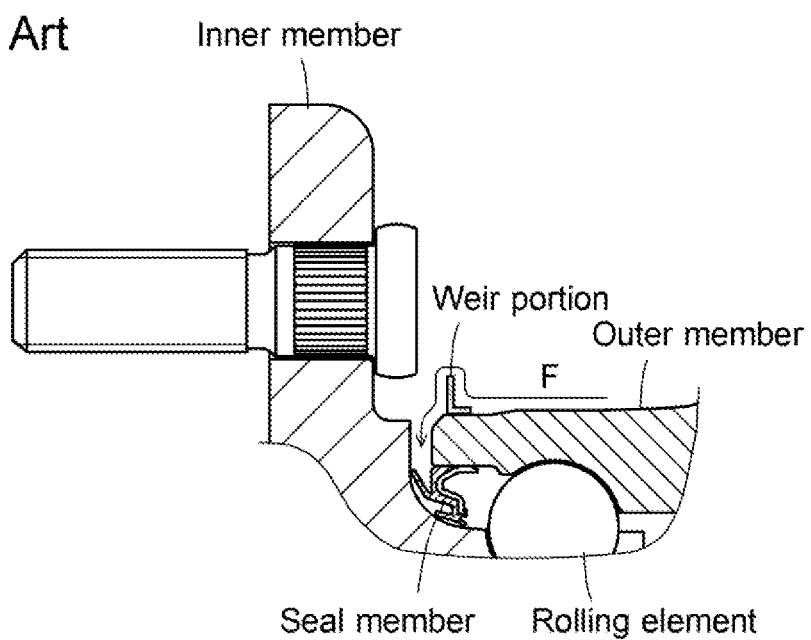
Figure 25:
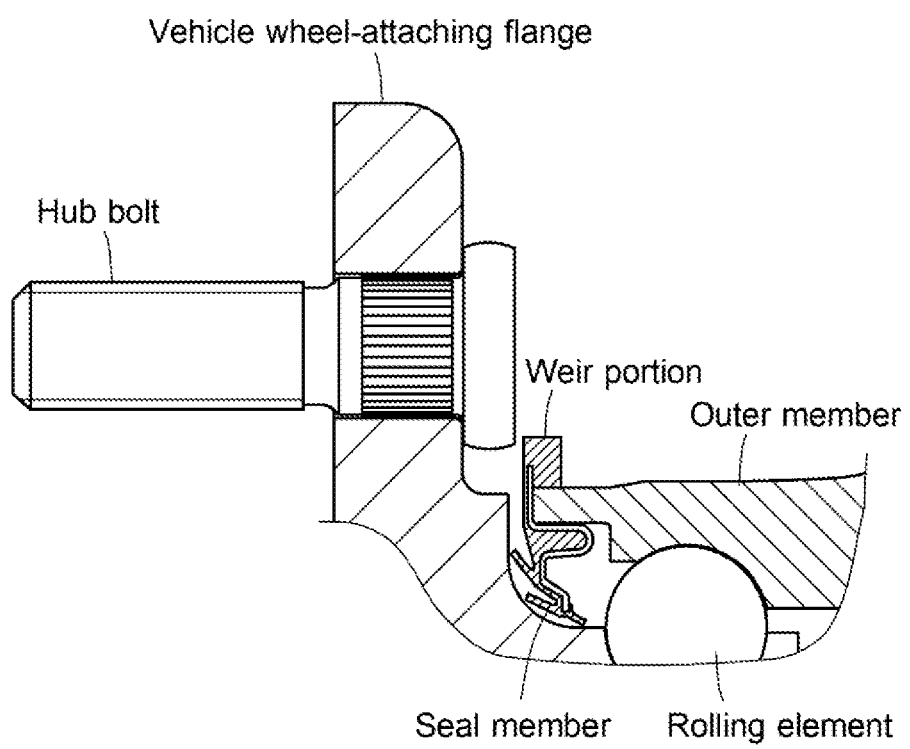
FIG. 25 is a sectional view illustrating a partial configuration of a conventional bearing device for a vehicle wheel.

As illustrated in FIG. 23, the hub bolts 40 are removed through the respective guide grooves 20T of the weir portion 20. The hub bolts 40 are attached through the respective guide grooves 20T of the weir portion 20. If only the guide grooves 20T, the number of which is the same as the number of hub bolts 40 or is a multiple of the number of hub bolts 40, are circumferentially disposed at regular intervals on the concentric circle, all of the hub bolts 40 can be simultaneously associated with all of the guide grooves 20T in phase.

As described above, the guide grooves 20T, the number of which is the same as the number of hub bolts 40 or is a multiple of the number of hub bolts 40, are circumferentially disposed at regular intervals on the concentric circle. In the bearing device 1 for a vehicle wheel, all of the hub bolts 40 can be aligned with all of the guide grooves 20T, facilitating the operation of exchanging the hub bolt 40.

REFERENCE SIGNS LIST

1 Bearing device for vehicle wheel
2 Outer member
2c Outer rolling face
2d Outer rolling face
3 Inner member
4 Hub wheel
4a Narrowed stepped portion
4d Inner rolling face
4h Vehicle wheel-attaching flange
5 Inner wheel
5a Inner rolling face
6 Rolling element
6a Ball row
6b Ball row
7 Seal member (inner-side seal member)
10 Seal member (outer-side seal member)
20 Weir portion
20a Weir wall face
20b Guide groove
20c Folded portion
20T Guide groove
40 Hub bolt
111 Core metal
111a Fitting portion
111b Side plate portion
111c Stop plate portion
111d Folded portion
112 Seal rubber
112a Radial lip
112b Inner axial lip
112c Outer axial lip
112d Outer circumferential seal portion
112e Penetrating groove
S Annular space
L Rotation axis
V Vertical line
H Horizontal line
Us Upper half of outer member
Ls Lower half of outer member
α Inclination angle of weir wall face

The invention claimed is:

1. A bearing device for a vehicle wheel comprising:
an outer member having double-row outer rolling faces on an inner circumference of the outer member;
an inner member including a hub wheel having a vehicle wheel-attaching flange into which a plurality of hub bolts are press-fitted and an axially-extending narrowed stepped portion, and at least one inner wheel press-fitted to the narrowed stepped portion of the hub wheel, the inner member having double-row inner rolling faces opposed to the double-row outer rolling faces on an outer circumference of the inner member;
double-row rolling elements rollably interposed between the rolling faces of the outer member and the rolling faces of the inner member; and
a seal member for sealing an outer-side end of an annular space formed between the outer member and the inner member,
wherein a ring-like weir portion about a rotation axis of the inner member is provided on an outer circumference of an outer-side end of the outer member, and
the weir portion is asymmetrical in an upper half and a lower half of the outer member, and a weir wall face in a part or whole of the upper half is inclined toward an inner side in a radial outward direction.

2. The bearing device for a vehicle wheel according to claim 1, wherein the weir wall face of the weir portion in a part or whole of the lower half is inclined toward an outer side in the radial outward direction.

3. The bearing device for a vehicle wheel according to claim 1, wherein the weir portion has a folded portion extending toward the inner side on an outer edge of the weir portion.

4. The bearing device for a vehicle wheel according to claim 1, wherein the weir portion has guide grooves for passing the respective hub bolts therethrough on an outer edge of the weir portion.

5. The bearing device for a vehicle wheel according to claim 4, wherein
the plurality of hub bolts are circumferentially disposed at regular intervals on a concentric circle about the rotation axis, and
the guide grooves are circumferentially disposed at regular intervals on the concentric circle, the number of the guide grooves being same as the number of the hub bolts or being a multiple of the number of the hub bolts.

6. A bearing device for a vehicle wheel comprising:
an outer member having double-row outer rolling faces on an inner circumference of the outer member;
an inner member including a hub wheel having a vehicle wheel-attaching flange into which a plurality of hub bolts are press-fitted and an axially-extending narrowed stepped portion, and at least one inner wheel press-fitted to the narrowed stepped portion of the hub wheel, the inner member having double-row inner rolling faces opposed to the double-row outer rolling faces on an outer circumference of the inner member;
double-row rolling elements rollably interposed between the rolling faces of the outer member and the rolling faces of the inner member; and
a seal member for sealing an outer-side end of an annular space formed between the outer member and the inner member,
wherein the seal member is configured such that a seal rubber is integrally bonded to a core metal by vulcanization, and has a weir portion fitted to an outer circumference of the outer member, the weir portion has a folded portion formed by bending the core metal toward an axial inner side, the core metal extending along an outer-side end face of the outer member further than the outer member in a radial outward direction, the weir portion is configured such that seal rubber is integrally bonded to the folded portion by vulcanization, and guide grooves for passing the respective hub bolts therethrough are formed on an outer circumference of the seal rubber.

7. The bearing device for a vehicle wheel according to claim 6, wherein when the bearing device is attached to a vehicle body, given a vertical line that intersects with a rotation axis of the inner member and is parallel to a gravity-acting direction and a horizontal line that intersects with the rotation axis and is perpendicular to the vertical line, the guide grooves are formed to intersect with or to be located in the vicinity of the horizontal line.

8. The bearing device for a vehicle wheel according to claim 6, wherein the plurality of hub bolts are circumferentially disposed at regular intervals on a concentric circle about a rotation axis of the inner member, and the guide grooves are circumferentially disposed at regular intervals on the concentric circle, the number of the guide grooves being same as the number of the hub bolts or being a multiple of the number of the hub bolts.

\* \* \* \* \*